US012770157B2

(12) United States Patent
Ezrielev et al.

(10) Patent No.: US 12,770,157 B2
(45) Date of Patent: Oct. 20, 2026

(54) SYSTEM AND METHOD FOR MANAGEMENT OF INFERENCE MODELS OF VARYING COMPLEXITY

(71) Applicant: Dell Products L.P., Round Rock, TX (US)

(72) Inventors: Ofir Ezrielev, Beer Sheva (IL); Jehuda Shemer, Kfar Saba (IL); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 638 days.

(21) Appl. No.: 18/060,124

(22) Filed: Nov. 30, 2022

(65) Prior Publication Data

US 2024/0177179 A1 May 30, 2024

(51) Int. Cl.
*G06Q 30/0201* (2023.01)
*G06Q 10/0637* (2023.01)

(52) U.S. Cl.
CPC ... *G06Q 30/0201* (2013.01); *G06Q 10/06375* (2013.01)

(58) Field of Classification Search
None
See application file for complete search history.

(56) References Cited

U.S. PATENT DOCUMENTS 7,593,729 B2 9/2009 Barak
10,142,174 B2 11/2018 Yang et al.
10,341,354 B2 7/2019 Murugesan et al.
10,853,129 B1 12/2020 Sengupta
11,216,482 B2 1/2022 Khillar et al.
11,886,960 B2 1/2024 Kaufmann
(Continued)

OTHER PUBLICATIONS

Liang et al., "Model-driven Cluster Resource Management for AI Workloads in Edge Clouds"; arXiv:2201.07312v1 [cs.DC] Jan. 18, 2022; Total pp. 23 (Year: 2022), Retrieved from <https://arxiv.org/abs/2201.07312> on Sep. 2, 2025.
(Continued)

*Primary Examiner* — Rutao Wu
*Assistant Examiner* — Zahra Elkassabgi
(74) *Attorney, Agent, or Firm* — WOMBLE BOND DICKINSON (US) LLP

(57) ABSTRACT

Methods and systems for timely execution of inference models hosted by data processing systems are disclosed. To manage inference models hosted by data processing systems, a system may include an inference model manager and any number of data processing systems. The inference models may include inference models with higher complexity topology and inference models with lower complexity topology. The data processing systems may be provided with instructions for when to execute higher complexity topology inference models and when to operate lower complexity topology inference models. The inference model manager may analyze data processing system information and downstream consumer information to determine whether the current deployment of inference models to the data processing systems is capable of meeting the needs of a downstream consumer. Based on the analysis, an execution plan for the inference models and the distribution of inference models may be updated.

20 Claims, 12 Drawing Sheets

(56) References Cited

U.S. PATENT DOCUMENTS

| | | | |
|---|---|---|---|
| 2008/0256167 | A1 | 10/2008 | Branson |
| 2016/0098297 | A1 | 4/2016 | Yuyitung |
| 2018/0365576 | A1* | 12/2018 | Guttmann .............. G06N 5/046 |
| 2019/0050505 | A1 | 2/2019 | Nendorf |
| 2019/0102700 | A1 | 4/2019 | Babu |
| 2019/0266504 | A1 | 8/2019 | Apparao |
| 2020/0027157 | A1* | 1/2020 | Xu ........................... G06N 7/01 |
| 2020/0104749 | A1 | 4/2020 | Sartorello |
| 2020/0145448 | A1 | 5/2020 | Vu |
| 2020/0193218 | A1 | 6/2020 | Liu |
| 2020/0193313 | A1 | 6/2020 | Ghanta |
| 2020/0219007 | A1 | 7/2020 | Byers |
| 2021/0255886 | A1 | 8/2021 | Von Niederhausern |
| 2021/0319098 | A1 | 10/2021 | Pogorelik |
| 2022/0036160 | A1 | 2/2022 | Sasagawa |
| 2022/0156368 | A1 | 5/2022 | Spyridopoulos |
| 2022/0237506 | A1 | 7/2022 | Feldman |
| 2022/0269835 | A1 | 8/2022 | Yang |
| 2022/0414503 | A1 | 12/2022 | Park |
| 2023/0010769 | A1 | 1/2023 | Umezawa |
| 2023/0012487 | A1 | 1/2023 | Makaya |
| 2023/0168932 | A1 | 6/2023 | Rafferty |
| 2023/0168950 | A1 | 6/2023 | Lee |
| 2023/0252328 | A1 | 8/2023 | Swami |
| 2023/0267344 | A1 | 8/2023 | Chang |
| 2023/0273813 | A1 | 8/2023 | Fong |
| 2023/0342203 | A1 | 10/2023 | Yang |
| 2024/0020296 | A1 | 1/2024 | Ezrielev |
| 2024/0020555 | A1 | 1/2024 | Ezrielev |
| 2025/0030766 | A1 | 1/2025 | Dubey |
| 2025/0265383 | A1 | 8/2025 | Nendorf |

OTHER PUBLICATIONS

Filho et al., “A Systematic Literature Review on Distributed Machine Learning in Edge Computing”; Sensors 2022, 22, 2665. Published Mar. 23, 2022; Total Pages: 36 (Year: 2022), Retrieved from <https://doi.org/10.3390/s22072665> on Sep. 2, 2025.

Eck, B., Fusco, F., Gormally, R., Purcell, M., & Tirupathi, S. (Mar. 24, 2020). “Scalable deployment of AI time-series models for IoT.” arXiv preprint arXiv:2003.12141. (7 pages).

Chen, B., Eck, B., Fusco, F., Gormally, R., Purcell, M., Sinn, M., & Tirupathi, S. (Nov. 2018). “Castor: Contextual IoT time series data and model management at scale.” In 2018 IEEE International Conference on Data Mining Workshops (ICDMW) (pp. 1487-1492). IEEE. Retrieved from <https://arxiv.org/pdf/1811.08566> on Oct. 10, 2025. (6 pages).

Saeed et al., “Model Adaptation and Personalization for Physiological Stress Detection.” Oct. 2018. (Year: 2018) Retrieved from <https://tstojan.github.io/pub/DSAA2018_ModelAdaptandPersonPhysiologicaStressDetection.pdf> on Oct. 13, 2025. (8 pages).

Zhang et al., “Bandwidth-Efficient Multi-Task AI Inference with Dynamic Task Importance for the Internet of Things in Edge Computing.” Aug. 2022. (Year: 2022) (13 pages).

Abadi, Martin et al. (Mar. 16, 2016). “TensorFlow: Large-Scale machine learning on heterogeneous distributed systems.” arXiv.org. <https://arxiv.org/abs/1603.04467> (19 pages).

“Software performance testing”, Wikipedia, Wikimedia Foundation, https://en.wikipedia.org/wiki/Software_performance_testing (8 Pages).

“The Ultimate Guide to Performance Testing and Software Testing: Testing Types, Performance Testing Steps, Best Practices, and More”, Stackify, Apr. 16, 2021, https://stackify.com/ultimate-guide-performance-testing-and-software-testing/ (23 Pages).

“High availability software”, Wikipedia, Wikimedia Foundation, https://en.wikipedia.org/wiki/High_availability_software (5 Pages).

“Load balancing (computing)”, Wikipedia, Wikimedia Foundation, https://en.wikipedia.org/wiki/Load_balancing (computing) (17 Pages).

Thompson, Julie D. et al., “Multiple Sequence Alignment Using ClustalW and ClustalX”, Current Protocols in Bioinformatics (2003) 2.3.1-2.3.22 (22 Pages).

Zhao, Shixiong et al., “HAMS: High Availability for Distributed Machine Learning Service Graphs”, 2020 50th Annual IEEE/IFIP International Conference on Dependable Systems and Networks (DSN). IEEE, 2020 (13 Pages).

Hu, Chenghao et al., “Distributed Inference with Deep Learning Models across Heterogeneous Edge Devices.” IEEE Infocom 2022—IEEE Conference on Computer Communications. IEEE, 2022 (8 Pages).

Mao et al., “A Survey on Mobile Edge Computing: The Communication Perspective”, arXiv: 1701.01090v4 [cs. IT], Jun. 13, 2017 (37 pages).

Shi et al., “Communication-Efficient Edge AI: Algorithms and Systems”, arXiv: 2002.09668v1 [cs.IT], Feb. 22, 2020 (24 pages).

Filho et al., “A Systematic Literature Review on Distributed Machine Learning in Edge Computing”, sensors. retreived from <https://www.mdpi.com/1424-8220/22/7/2665> on Apr. 6, 2026, pp. 1-36, Mar. 30, 2022 (36 pages).

Liang et al., “Model-driven Cluster Resource Management forAI Workloads in Edge Clouds”, ACM Transactions on Autonomous and Adaptive Systems. vol. 18, Issue 1, retrieved from <https://dl.acm. org/doi/epdf/10.1145/3582080> on Apr. 6, 2026, pp. 1-27, Mar. 2023 (27 pages).

* cited by examiner

SYSTEM AND METHOD FOR MANAGEMENT OF INFERENCE MODELS OF VARYING COMPLEXITY

FIELD

Embodiments disclosed herein relate generally to inference generation. More particularly, embodiments disclosed herein relate to systems and methods to manage inference generation based on inference consumer expectations.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
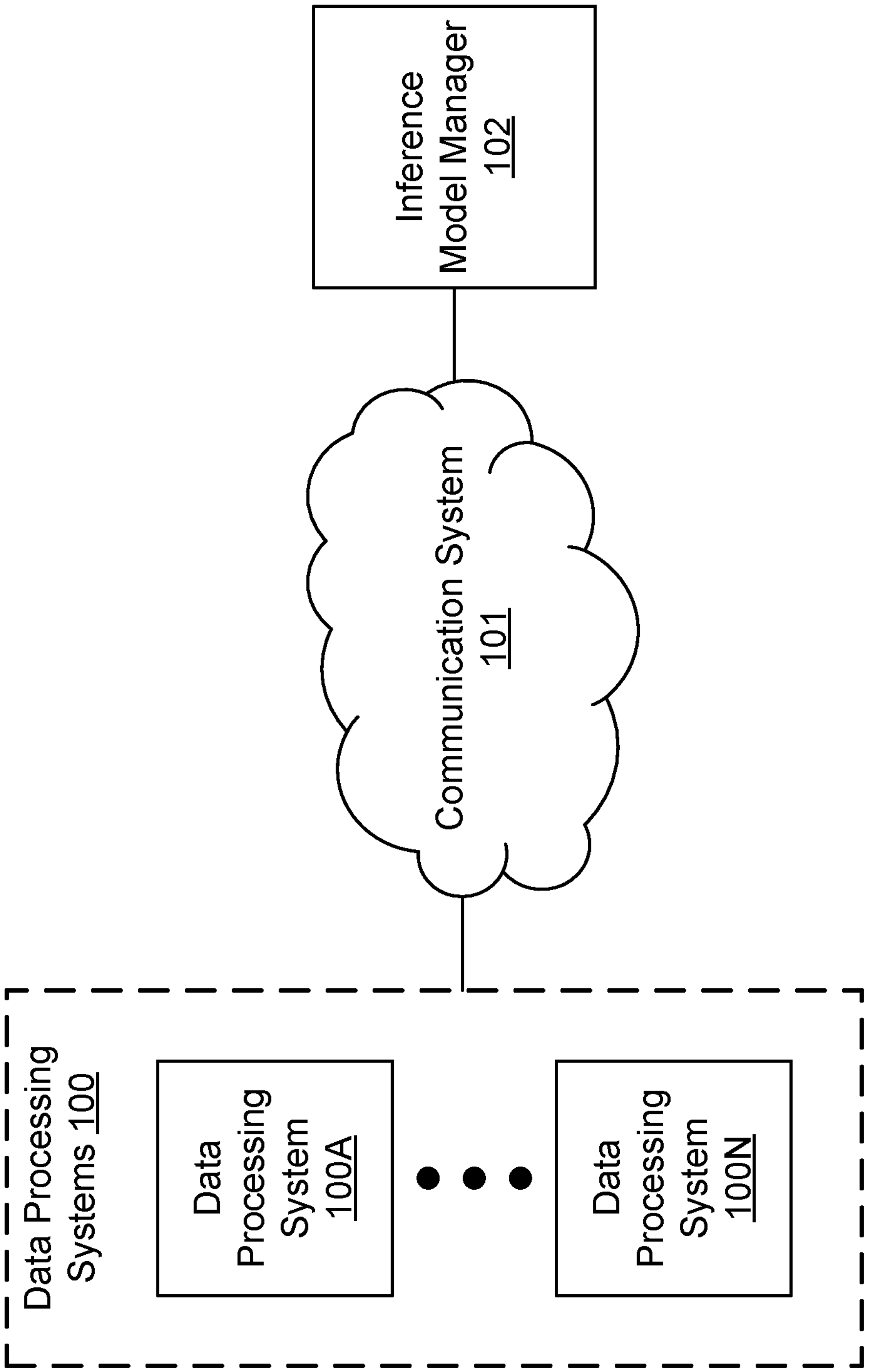
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing inference models hosted by data processing systems throughout a distributed environment. To manage execution of the inference models, the system may include an inference model manager and any number of data processing systems. The data processing systems may host and operate inference models trained to generate inferences usable by a downstream consumer. However, inference accuracy needs of the downstream consumer may change over time. Therefore, situations may arise in which the inferences generated by the deployed inference models are (at least temporarily) insufficient to meet the inference accuracy needs of the downstream consumer. A static (e.g., fixed) deployment of the inference models may not allow the downstream consumer to customize accuracy of the inferences generated by the inference models over time. Consequently, the downstream consumer may not reliably utilize the inferences to make decisions (and/or other uses).

To allow the downstream consumer to customize inference accuracy over time, the inference model manager may dynamically modify the deployment of the inference models and/or instructions for execution of the inference models when the current deployment of the inference models is insufficient to meet the inference accuracy needs of the downstream consumer.

To manage execution of inference models deployed to data processing systems, the inference model manager may obtain downstream consumer information and data processing system information. The downstream consumer information may include instructions for deployment and/or execution of the inference models to meet the inference accuracy needs of the downstream consumer. The data processing system information may include the type of inference model hosted by each data processing system and the computing resources available to each data processing system of the data processing systems.

The inference model manager may perform an analysis of the downstream consumer information and the data processing system information to determine whether the current deployment of the inference models meets the inference accuracy needs of the downstream consumer. As a result of the analysis, the inference model manager may identify a set of potential changes to an execution plan for the inference models.

Following the analysis, the inference model manager may implement at least one potential change of the set of potential changes to the execution plan to obtain an updated execution plan for the inference models. The inference model manager may then update a distribution of the inference models based on the updated execution plan.

In an embodiment, a method for managing inference models hosted by data processing systems to complete timely execution of the inference models is provided.

The method may include: obtaining downstream consumer information, the downstream consumer information indicating: an inference model bias preference; obtaining data processing system information for the data processing systems, the data processing system information indicating quantities of types of the inference models that are hosted by the data processing systems; performing, using the inference model bias preference and the data processing system information, a bias analysis for the inference model to identify a first potential change to an execution plan, the first potential change being a member of a set of potential changes; implementing at least one potential change of the set of potential changes to the execution plan to obtain an updated execution plan for the inference models; and updating a distribution of the inference models based on the updated execution plan.

The downstream consumer information may also indicate sensitivity regions, and the method may also include: performing, using the sensitivity regions, a process sensitivity analysis for an inference model of the inference models to identify a second potential change to the execution plan, wherein the set of potential changes further comprises the second potential change to the execution plan.

The downstream consumer information may also indicate an inference uncertainty goal, and the method may also include: performing, using the inference uncertainty goal, an uncertainty analysis for the inference model to identify a third potential change to the execution plan; wherein the set of potential changes further comprises the third potential change to the execution plan.

The downstream consumer information may also indicate a likelihood of completion of execution of the inference models, and the method may also include: performing, using the likelihood of completion of the execution of the inference models, a completion success analysis for the inference model to identify a fourth potential change to the execution plan; and wherein the set of potential changes further comprises the fourth potential change to the execution plan.

The inference model bias preference may indicate that a first type of inference model is biased towards generating a first type of inference, and the bias analysis may include: making a first identification of types and quantities of deployed inference models; making a second identification of whether the types and the quantities of the deployed inference models meet the inference model bias preference; making a third identification of whether the data processing systems are configured to automatically initiate execution of a second type of inference model when a first type of the deployed inference models generates an inference that falls within a range defined by the inference model bias preference; and obtaining the first potential change based on the first identification, the second identification, and the third identification.

A first type of inference model of the inference models may consume a first quantity of computing resources, and a second type of inference model of the inference models may consume a second quantity of computing resources.

The second type of inference model may be of a higher complexity topology than the first type of inference model.

The sensitivity regions may define ranges of values of inferences generated by the inference models that, when met, initiate a change in operation of the inference models, and the process sensitivity analysis may include: making a first identification of at least one inference generated by a first type of the inference models; making a second identification of whether the at least one inference falls within a range defined by the sensitivity regions; making a third identification of whether the data processing systems are configured to automatically initiate execution of a second type of inference model when the at least one inference falls within the range; and obtaining the second potential change based on the first identification, the second identification, and the third identification.

The inference uncertainty goal may indicate an uncertainty threshold for acceptable uncertainty in inferences generated by the inference models, and the uncertainty analysis may include: making a first identification of at least one inference generated by a first type of the inference models; making a second identification of whether the at least one inference falls within a range defined by the inference uncertainty goal; making a third identification of whether the data processing systems are configured to automatically initiate execution of a second type of inference model when the at least one inference falls within the range; and obtaining the third potential change based on the first identification, the second identification, and the third identification.

The likelihood of completion of execution of the inference models may include: a preference for continued operation of a first type of inference model when a probability of successful completion of execution of the inference models is below a probability threshold; and the completion success analysis comprises: making a first identification of a level of risk associated with future operation of the inference models; and obtaining the fourth potential change based on the preference for the continued operation and the first identification.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. Inferences may be used when the computer-implemented services are provided. The inferences may be generated by inference models hosted by data processing systems throughout a distributed environment.

To provide the computer-implemented services, the system of FIG. 1 may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by the inference models hosted by the data processing systems throughout the distributed environment.

To facilitate execution of the inference models, the system may include data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of the inference models.

For example, all, or a portion, of data processing systems 100 may provide computer-implemented services to users and/or other computing devices operably connected to data processing systems 100. The computer-implemented services may include any type and quantity of services including, for example, generation of a partial or complete processing result using an inference model of the inference models. Different data processing systems may provide similar and/or different computer-implemented services.

Inferences generated by the inference models may be utilized to provide computer-implemented services to a downstream consumer. To provide the computer-implemented services, inference models may be deployed to data processing systems 100. The inference models may vary in complexity (e.g., may consume different quantities of computing resources during operation and may vary in the complexity of the topology of the inference model). Higher complexity inference models may generate more accurate inferences than lower complexity inference models but may consume more computing resources to generate the inferences.

The inference models may be deployed to data processing systems 100 in accordance with an execution plan. The execution plan may indicate: (i) a quantity of each inference model of the inference models to be deployed to the data processing systems, (ii) distribution locations for the inference models, (iii) instructions for execution of the inference models according to the inference accuracy needs of the downstream consumer, and/or other instructions.

The instructions for execution of the inference models may indicate whether to operate a higher or lower complexity topology inference model based on operating conditions of the data processing systems. For example, data processing systems 100 may execute a higher complexity inference model when the downstream consumer requests or otherwise indicates a need for higher accuracy inferences. In contrast, data processing systems 100 may execute a lower complexity inference model when the downstream consumer does not request or otherwise indicate a need for higher accuracy inferences, thereby conserving computing resources. However, the needs of the downstream consumer with respect to accuracy of inferences generated by the inference models may change (temporarily or permanently) over time. A static (e.g., fixed) deployment of the inference models may not provide the downstream consumer with the ability to customize the accuracy of inferences over time.

In general, embodiments disclosed herein may provide methods, systems, and/or devices for managing inference models hosted by data processing systems to complete timely execution of the inference models. To manage the inference models, a system in accordance with an embodiment may distribute the inference models according to an execution plan. The execution plan may include instructions for timely execution of the inference models with respect to the inference accuracy needs of the downstream consumer. If the inference accuracy needs (and/or other needs) of the downstream consumer change over time, data obtained from the data processing systems may be analyzed to determine whether the current deployment of inference models is sufficient to meet the updated needs of the downstream consumer. When the current deployment of the inference models is insufficient to meet the updated needs of the downstream consumer, an updated execution plan may be obtained and implemented across the data processing systems.

Figure 3A:
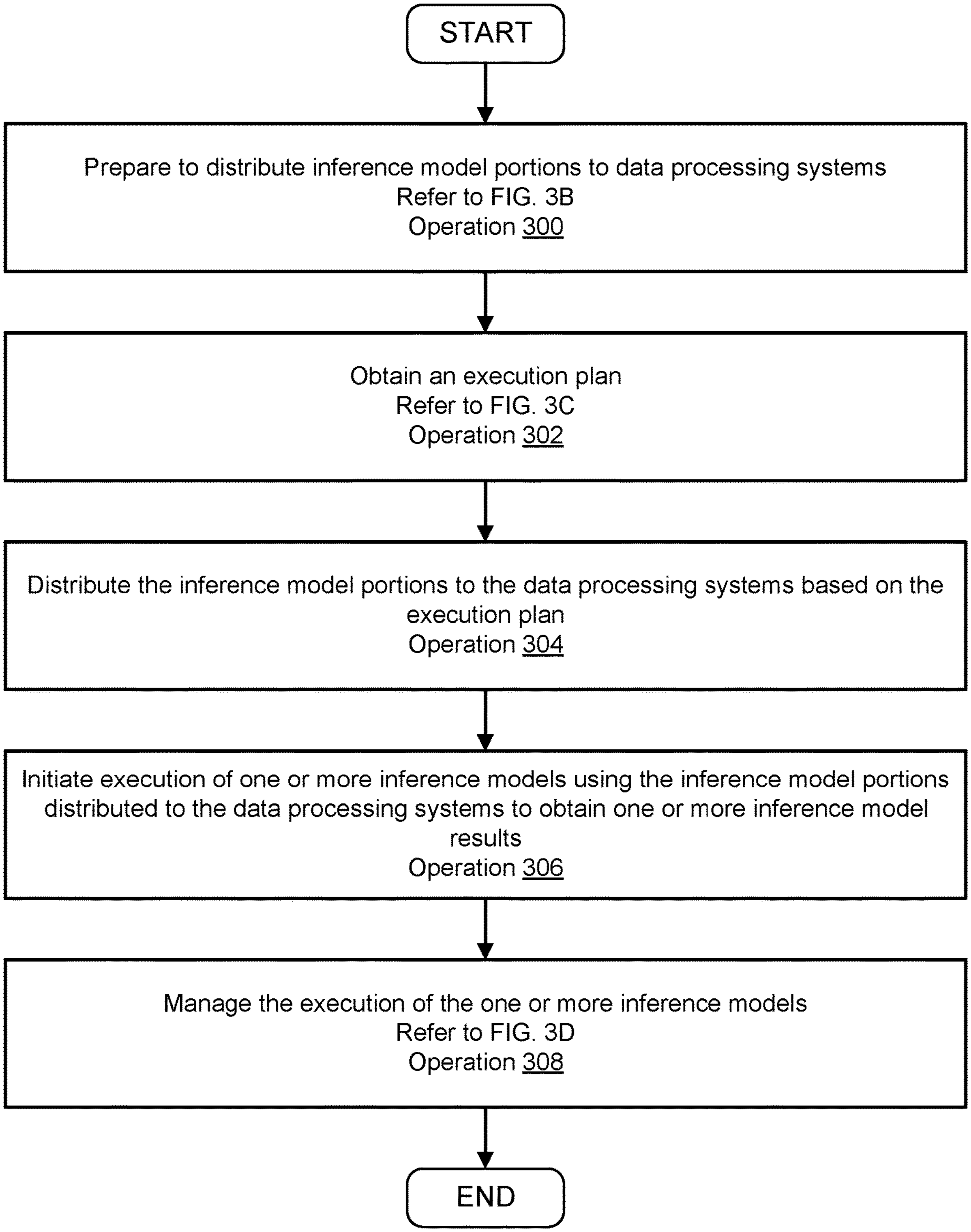
FIG. 3A shows a flow diagram illustrating a method of managing inference models hosted by data processing systems to complete timely execution of the inference models in accordance with an embodiment.
Figure 3B:
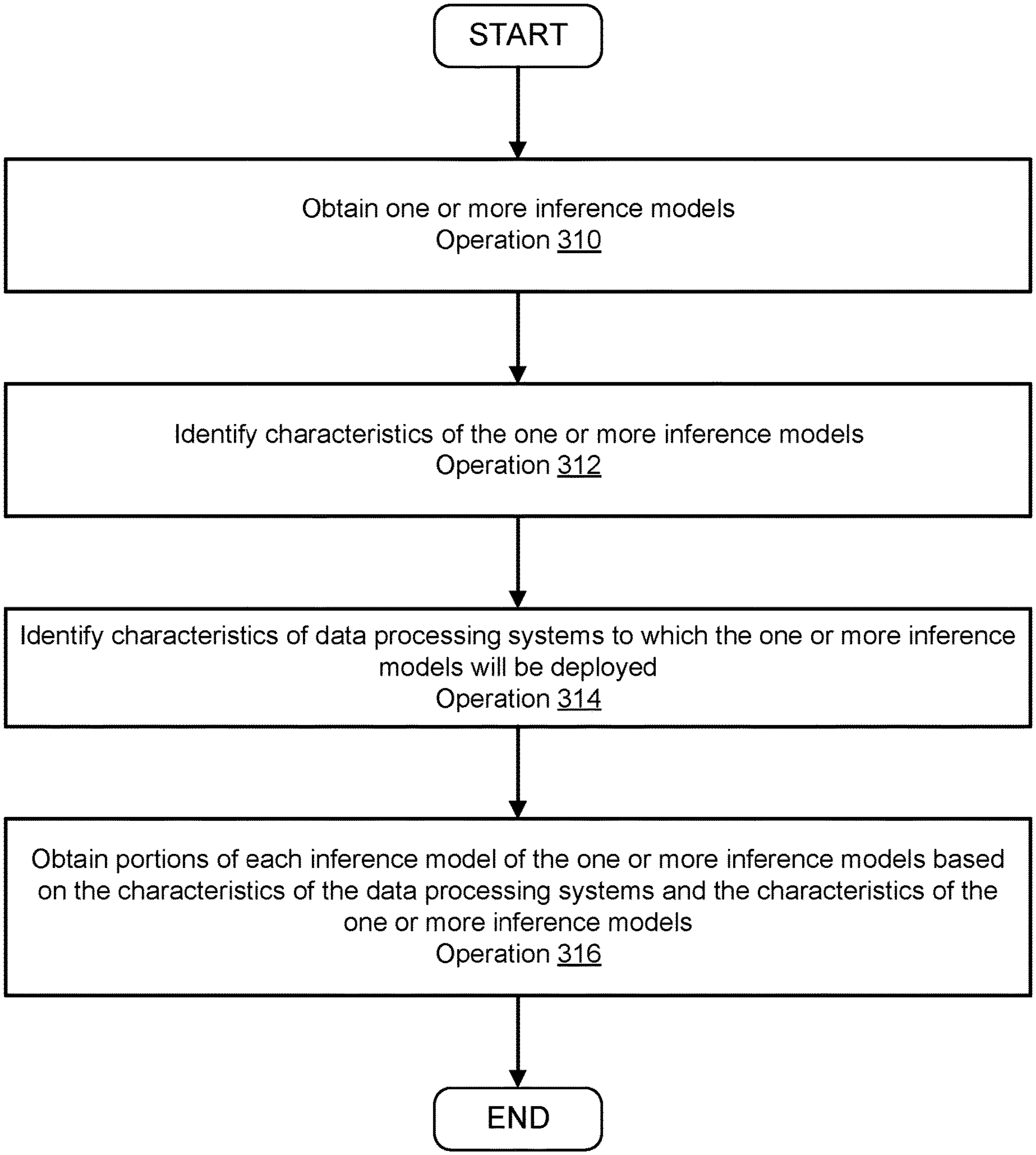
FIG. 3B shows a flow diagram illustrating a method of preparing to distribute inference model portions to data processing systems in accordance with an embodiment.
Figure 3C:
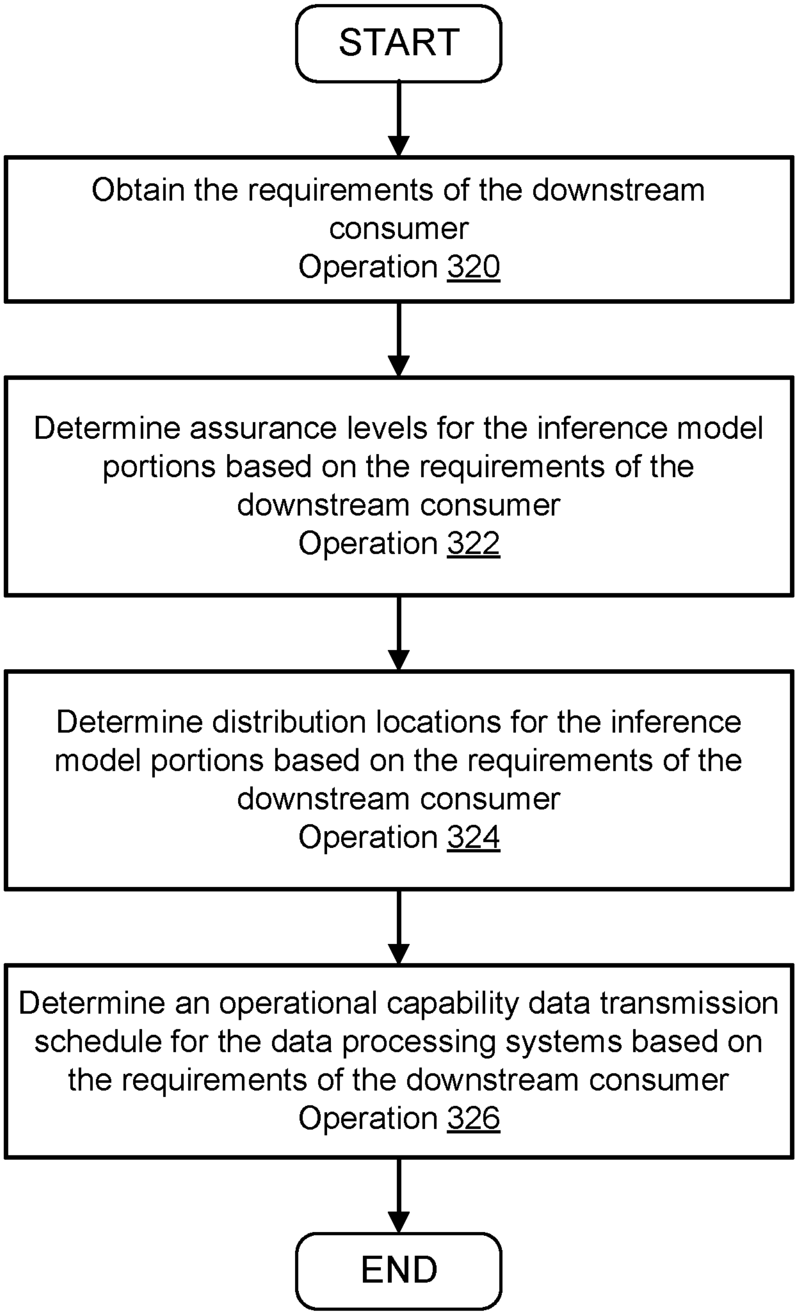
FIG. 3C shows a flow diagram illustrating a method of obtaining an execution plan in accordance with an embodiment.
Figure 3D:
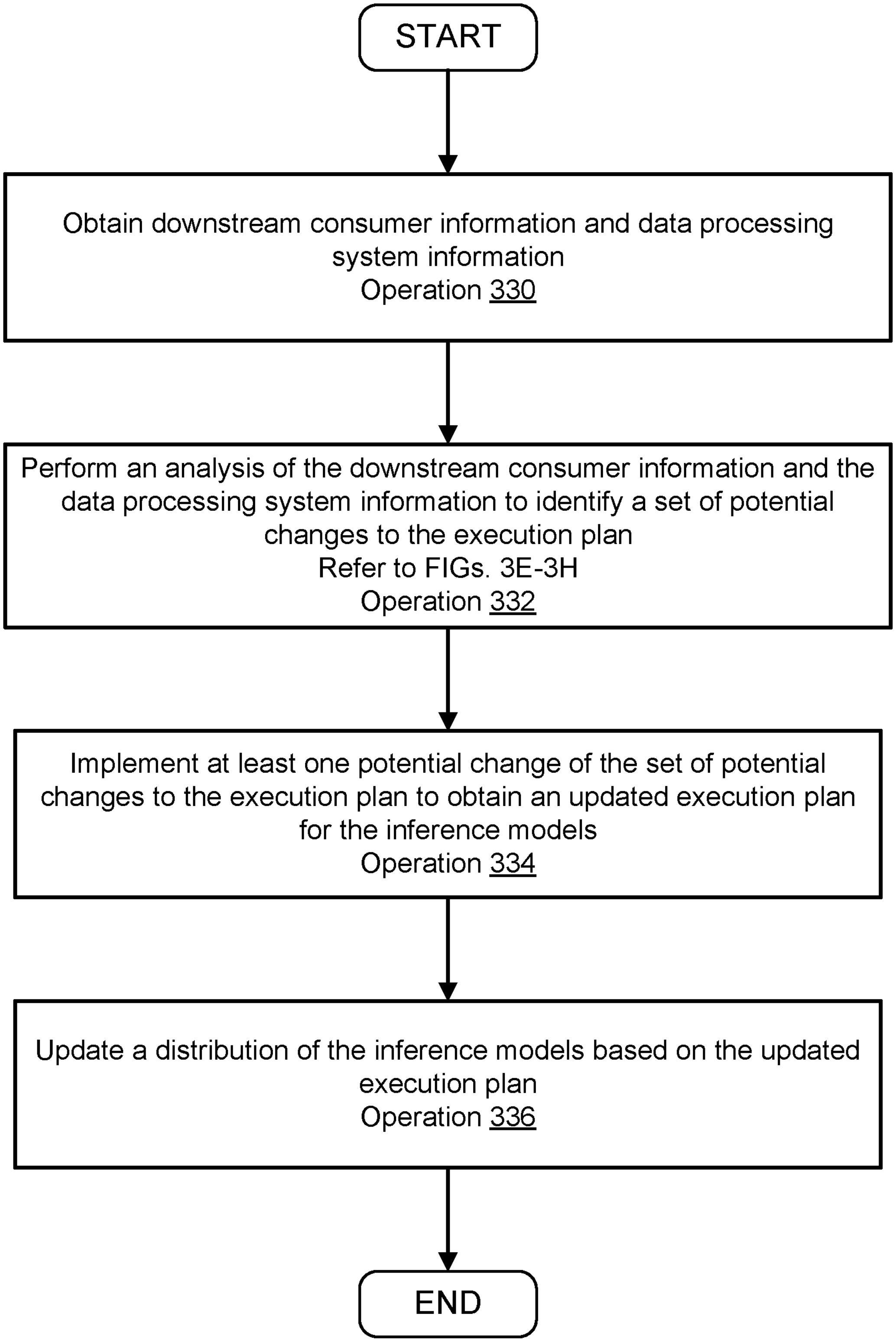
FIG. 3D shows a flow diagram illustrating a method of managing the execution of the inference models in accordance with an embodiment.

To provide its functionality, inference model manager 102 may (i) prepare to distribute inference model portions to data processing systems, the inference model portions being based on characteristics of the data processing system and characteristics of the inference models (Refer to FIG. 3B for further discussion), (ii) obtain an execution plan, the execution plan including instructions for timely execution of the inference models with respect to the needs of the downstream consumer (Refer to FIG. 3C for further discussion), (iii) distribute the inference model portions to the data processing systems, (iv) initiate execution of the inference models using the inference model portions distributed to the data processing systems, and/or (v) manage the execution of the inference models by analyzing data related to the downstream consumer and the data processing systems to determine whether a change to the execution plan is advantageous for the downstream consumer (Refer to FIG. 3D for further discussion). By doing so, the system may dynamically respond to changes in conditions and needs of downstream consumers while conserving computing resource expenditures for inference generation.

When performing its functionality, inference model manager 102 and/or data processing systems 100 may perform all, or a portion, of the methods and/or actions shown in FIGS. 3A-3H.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data processing systems 100 and/or inference model manager 102 are implemented using an internet of things (IoT) device, which may include a computing device. The IoT device may operate in accordance with a communication model and/or management model known to inference model manager 102, other data processing systems, and/or other devices.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
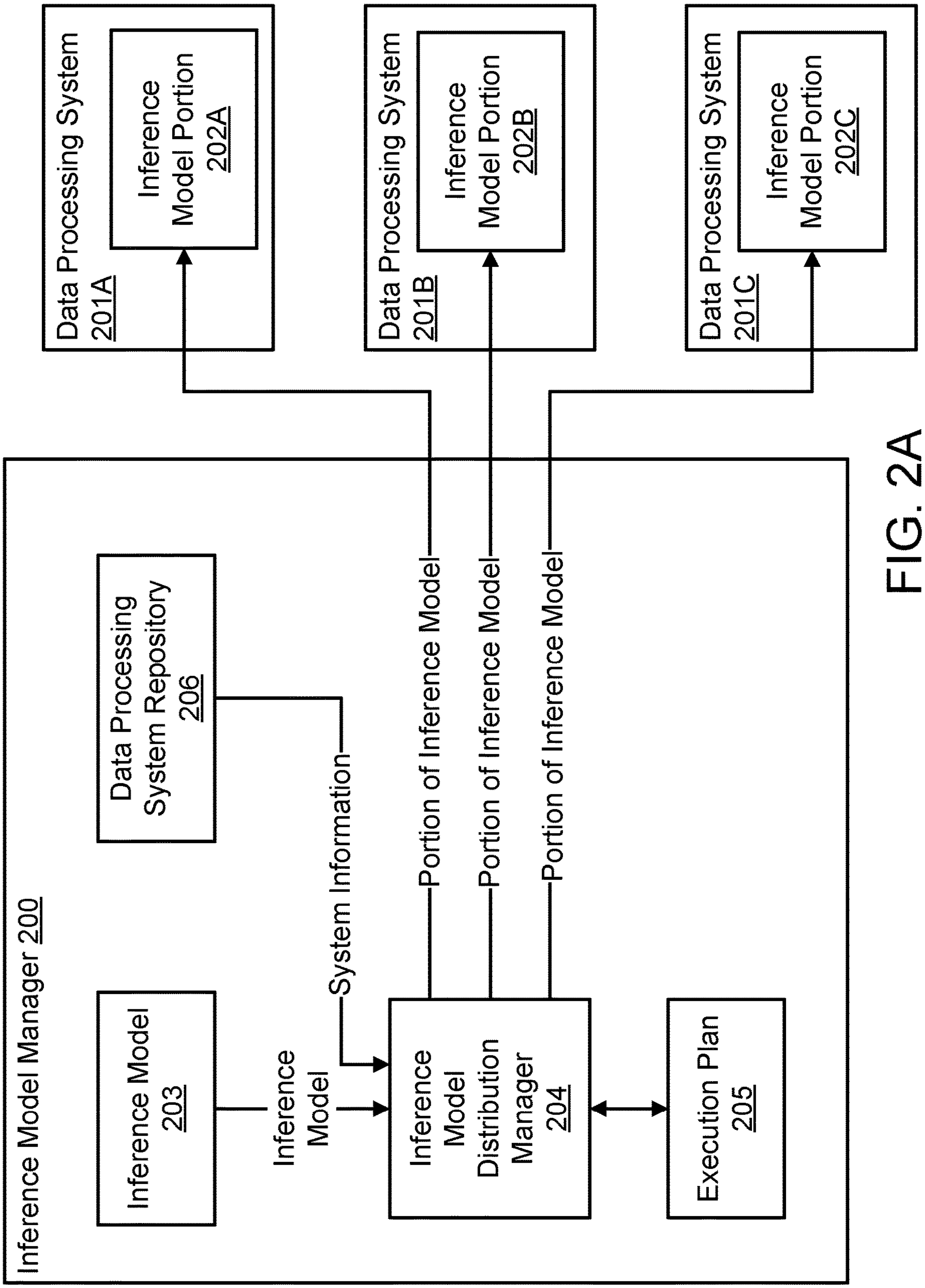
FIG. 2A shows a block diagram illustrating an inference model manager and multiple data processing systems over time in accordance with an embodiment.
Figure 2B:
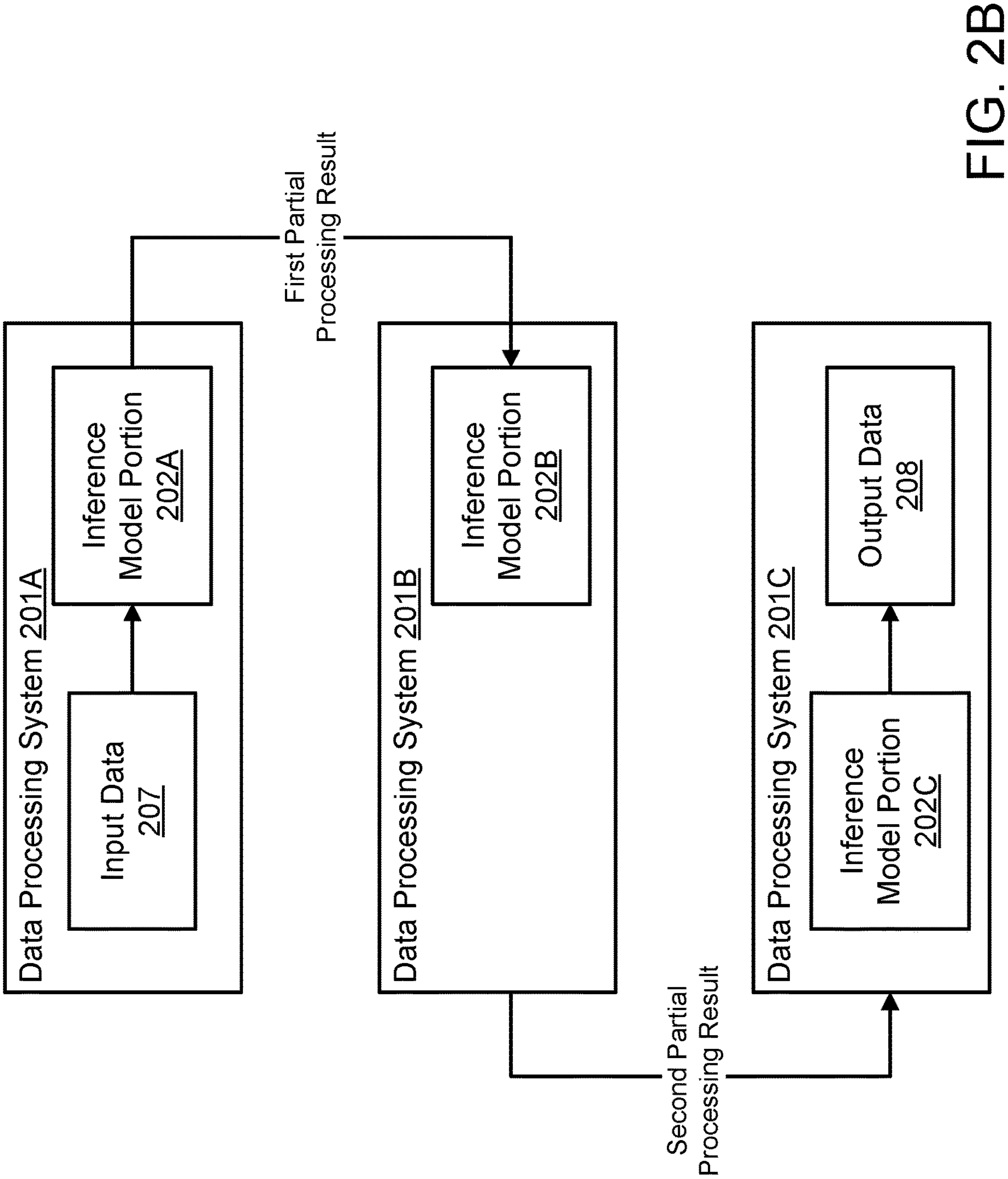
FIG. 2B shows a block diagram illustrating multiple data processing systems over time in accordance with an embodiment.

To further clarify embodiments disclosed herein, diagrams illustrating data flows and/or processes performed in a system in accordance with an embodiment are shown in FIGS. 2A-2B.

FIG. 2A shows a diagram of inference model manager 200 and data processing systems 201A-201C in accordance with an embodiment. Inference model manager 200 may be similar to inference model manager 102, and data processing systems 201A-201C may be similar to any of data processing systems 100. In FIG. 2A, inference model manager 200 and data processing systems 201A-201C are connected to each other via a communication system (not shown). Communications between inference model manager 200 and data processing systems 201A-201C are illustrated using lines terminating in arrows.

As discussed above, inference model manager 200 may perform computer-implemented services by executing one or more inference models across multiple data processing systems that each individually have insufficient computing resources to complete timely execution of the one or more inference models. The computing resources of the individual data processing systems may be insufficient due to: insufficient available storage to host an inference model of the one or more inference models and/or insufficient processing capability for timely execution of an inference model of the one or more inference models.

While described below with reference to a single inference model (e.g., inference model 203), the process may be repeated any number of times with any number of inference models without departing from embodiments disclosed herein.

To execute an inference model across multiple data processing systems, inference model manager 200 may obtain inference model portions and may distribute the inference model portions to data processing systems 201A-201C. The inference model portions may be based on: (i) the computing resource availability of data processing systems 201A-201C and (ii) communication bandwidth availability between the data processing systems. By doing so, inference model manager 200 may distribute the computational overhead and bandwidth consumption associated with hosting and operating the inference model across multiple data processing systems while reducing communications between data processing systems 201A-201C throughout the distributed environment.

To obtain inference model portions, inference model manager 200 may host inference model distribution manager 204. Inference model distribution manager 204 may (i) obtain an inference model, (ii) identify characteristics of data processing systems to which the inference model may be deployed, (iii) obtain inference model portions based on the characteristics of the data processing systems and characteristics of the inference model, (iv) obtain an execution plan based on the inference model portions, the characteristics of the data processing systems, and requirements of a downstream consumer (v) distribute the inference model portions to the data processing systems, (vi) initiate execution of the inference model using the inference model portions distributed to the data processing systems and/or (vii) manage the execution of the inference model based on the execution plan.

Inference model manager 200 may obtain inference model 203. Inference model manager 200 may obtain characteristics of inference model 203. Characteristics of inference model 203 may include, for example, a quantity of layers of a neural network inference model and a quantity of relationships between the layers of the neural network inference model. The characteristics of inference model 203 may also include the quantity of computing resources required to host and operate inference model 203. The characteristics of inference model 203 may include other characteristics based on other types of inference models without departing from embodiments disclosed herein.

Each portion of inference model 203 may be distributed to one data processing system throughout a distributed environment. Therefore, prior to determining the portions of inference model 203, inference model distribution manager 204 may obtain system information from data processing system repository 206. System information may include a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems.

Therefore, inference model distribution manager 204 may obtain a first portion of the inference model (e.g., inference model portion 202A) based on the system information (e.g., the available computing resources) associated with data processing system 201A and based on data dependencies of the inference model so that inference model portion 202A reduces the necessary communications between inference model portion 202A and other portions of the inference model. Inference model distribution manager 204 may repeat the previously described process for inference model portion 202B and inference model portion 202C.

Prior to distributing inference model portions 202A-202C, inference model distribution manager 204 may utilize inference model portions 202A-202C to obtain execution plan 205. Execution plan 205 may include instructions for timely execution of the inference model using the portions of the inference model and based on the needs of a downstream consumer of the inferences generated by the inference model. Refer to FIG. 3C for additional details regarding obtaining an execution plan.

Inference model manager 200 may distribute inference model portion 202A to data processing system 201A, inference model portion 202B to data processing system 201B, and inference model portion 202C to data processing system 201C. While shown in FIG. 2A as distributing three portions of the inference model to three data processing systems, the inference model may be partitioned into any number of portions and distributed to any number of data processing systems throughout a distributed environment. Further, while not shown in FIG. 2A, redundant copies of the inference model portions may also be distributed to any number of data processing systems in accordance with an execution plan.

Inference model manager 200 may initiate execution of the inference model using the portions of the inference model distributed to the data processing systems to obtain an inference model result (e.g., one or more inferences). The inference model result may be usable by a downstream consumer to perform a task, make a control decision, and/or perform any other action set (or action).

Inference model manager 200 may manage the execution of the inference model based on the execution plan. Managing execution of the inference model may include monitoring changes to a listing of data processing systems over time and/or revising the execution plan as needed to obtain the inference model result in a timely manner and/or in compliance with the needs of a downstream consumer. An updated execution plan may include re-assignment of data processing systems to new portions of the inference model and/or re-location of data processing systems to meet the needs of the downstream consumer. When providing its functionality, inference model manager 200 may use and/or manage agents across any number of data processing systems. These agents may collectively provide all, or a portion, of the functionality of inference model manager 200. As previously mentioned, the process shown in FIG. 2A may be repeated to distribute portions of any number of inference models to any number of data processing systems.

Turning to FIG. 2B, data processing systems 201A-201C may execute the inference model. To do so, data processing system 201A may obtain input data 207. Input data 207 may include any data of interest to a downstream consumer of the inferences. For example, input data 207 may include data indicating the operability and/or specifications of a product on an assembly line.

Input data 207 may be fed into inference model portion 202A to obtain a first partial processing result. The first partial processing result may include values and/or parameters associated with a portion of the inference model. The first partial processing result may be transmitted (e.g., via a wireless communication system) to data processing system 201B. Data processing system 201B may feed the first partial processing result into inference model portion 202B to obtain a second partial processing result. The second partial processing result may include values and/or parameters associated with a second portion of the inference model. The second partial processing result may be transmitted to data processing system 201C. Data processing system 201C may feed the second partial processing result into inference model portion 202C to obtain output data 208. Output data 208 may include inferences collectively generated by the portions of the inference model distributed across data processing systems 201A-201C.

Output data 208 may be utilized by a downstream consumer of the data to perform a task, make a decision, and/or perform any other action set that may rely on the inferences generated by the inference model. For example, output data 208 may include a quality control determination regarding a product manufactured in an industrial environment. Output data 208 may indicate whether the product meets the quality control standards and should be retained or does not meet the quality control standards and should be discarded. In this example, output data 208 may be used by a robotic arm to decide whether to place the product in a "retain" area or a "discard" area.

While shown in FIG. 2B as including three data processing systems, a system may include any number of data processing systems to collectively execute the inference model. Additionally, as noted above, redundant copies of the inference model hosted by multiple data processing systems may each be maintained so that termination of any portion of the inference model may not impair the continued operation of the inference model. In addition, while described in FIG. 2B as including one inference model, the system may include multiple inference models distributed across multiple data processing systems.

While described above as feeding input data 207 into data processing system 201A and obtaining output data 208 via data processing system 201C, other data processing systems may utilize input data and/or obtain output data without departing from embodiments disclosed herein. For example, data processing system 201B and/or data processing system 201C may obtain input data (not shown). In another example, data processing system 201A and/or data processing system 201B may generate output data (not shown). A downstream consumer may be configured to utilize output data obtained from data processing system 201A and/or data processing system 201B to perform a task, make a decision, and/or perform an action set.

Each of data processing systems 201A-201C may transmit operational capability data to inference model manager 102 (not shown) at variable time intervals as designated by an execution plan. The operational capability data may identify a type of each inference model hosted by each data processing system and a location of each data processing system. In addition, operational capability data may include a current computational resource capacity of each data processing system and/or other data.

Data processing systems 201A-201C may transmit the operational capability data to maintain membership in a listing of functional data processing systems throughout the distributed environment, to report their current computing resource capacity, and/or for other reasons. In the event that one of data processing systems 201A-201C may not transmit the operational capability data at the designated time, inference model manager 102 may obtain an updated execution plan and/or re-assign the inference model portions hosted by the data processing systems (described with more detail with respect to FIG. 3D).

By executing one or more inference models across multiple data processing systems, computing resource expenditure throughout the distributed environment may be reduced. In addition, by managing execution of the inference models, the functionality of the data processing systems may be adapted over time to remain in compliance with the needs of a downstream consumer.

In an embodiment, inference model distribution manager 204 is implemented using a processor adapted to execute computing code stored on a persistent storage that when executed by the processor performs the functionality of inference model distribution manager 204 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to execute inference models throughout a distributed environment. FIGS. 3A-3H illustrate methods that may be performed by the components of FIG. 1. In the diagrams discussed below and shown in FIGS. 3A-3H, any of the operations may be repeated, performed in different orders, and/or performed in parallel with or in a partially overlapping in time manner with other operations.

Turning to FIG. 3A, a flow diagram illustrating a method of managing inference models hosted by data processing systems to complete timely execution of the inference models in accordance with an embodiment is shown.

At operation 300, the inference model manager (and/or other entity) prepares to distribute inference model portions to data processing systems. To prepare to distribute inference model portions, the inference model manager may obtain one or more inference models, may identify characteristics of the inference models (e.g., computing resource requirements, or the like), may identify characteristics of the data processing systems, and may obtain portions of each inference model based on the characteristics of the inference models and the characteristics of the data processing systems. Refer to FIG. 3B for additional details regarding this preparation step.

At operation 302, an execution plan is obtained. The execution plan may be based on the inference model portions, the characteristics of the data processing systems, and requirements of a downstream consumer. The execution plan may include: (i) instructions for obtaining portions of the inference models, (ii) instructions for distribution of the inference models, (iii) instructions for execution of the inference models, and/or other instructions. The execution plan may be obtained to facilitate timely execution of the inference models in accordance with the needs of a downstream consumer of the inferences generated by the inference models. The execution plan may be generated by inference model manager 102 and/or obtained from another entity throughout the distributed environment. Refer to FIG. 3C for additional details regarding obtaining an execution plan.

At operation 304, the inference model portions are distributed to the data processing systems based on the execution plan. The inference model portions may be distributed to data processing systems in a manner that reduces communications between data processing systems during execution of the inference models and utilizes the available computing resources of each data processing system. One inference model portion of the inference model portions may be distributed to each data processing system of the data processing systems. The inference model portions may be distributed by sending copies of the inference model portions to corresponding data processing systems (e.g., via one or more messages), by providing the data processing systems with information that allows the data processing system to retrieve the inference model portions, and/or via other methods.

At operation 306, execution of the one or more inference models is initiated using the portions of the inference model distributed to the data processing systems to obtain one or more inference model results. The inference models may be executed in accordance with the execution plan. Inference model manager 102 may execute the inference models by sending instructions and/or commands to data processing systems 100 to initiate execution of the inference models, the one or more inferences models may automatically begin executing once deployed, and/or via other methods.

In an embodiment, the inference models ingest input data while executing. The input data may be obtained by inference model manager 102, any of data processing systems 100, and/or another entity. Inference model manager 102 may obtain the input data and/or transmit the input data to a first data processing system of data processing systems 100 along with instructions for timely executing a first inference model of the inference models based on the input data. The instructions for timely execution of the first inference model may be based on the needs of a downstream consumer with respect to the inferences generated by the first inference model. The inference models may ingest the input data during their execution and provide an output (e.g., an inference) based on the ingest.

At operation 308, execution of the one or more inference models is managed by the inference model manager. Execution of the inference models may be managed by obtaining downstream consumer information and data processing system information. The inference model manager may perform an analysis of the downstream consumer information and the data processing system information. The results of the analysis may indicate whether the data processing systems are capable of performing timely execution of the inference models in accordance with inference accuracy needs of the downstream consumer. If the data processing systems are not capable of performing timely execution of the inference models in accordance with the inference accuracy needs of the downstream consumer, the inference model manager may determine a set of potential changes to the execution plan. The inference model manager may implement at least one potential change of the set of potential changes to the execution plan to obtain an updated execution plan and may update a distribution of the inference models based on the updated execution plan. Refer to FIG. 3D for additional details regarding managing the execution of the inference models.

Managing the execution of the inference models may be performed by inference model manager 102, data processing systems 100, and/or any other entity. In a first example, the system may utilize a centralized approach to managing the execution of the inference models. In the centralized approach, an off-site entity (e.g., a data processing system hosting inference model manager 102) may make decisions and perform the operations detailed in FIG. 3D. In a second example, the system may utilize a de-centralized approach to managing the execution of the inference models. In the de-centralized approach, data processing systems 100 may collectively make decisions and perform the operations detailed in FIG. 3D. In a third example, the system may utilize a hybrid approach to managing the execution of the inference models. In the hybrid approach, and offsite entity may make high-level decisions (e.g., whether the data processing systems are in compliance with the needs of the downstream consumer) and may delegate implementation-related decisions (e.g., how to modify the execution plan and implement the updated execution plan) to data processing systems 100. The inference models may be managed via other methods without departing from embodiments disclosed herein.

The method may end following operation 308.

Turning to FIG. 3B, a method of preparing to distribute inference model portions to data processing systems in accordance with an embodiment is shown. The operations shown in FIG. 3B may be an expansion of operation 300 in FIG. 3A.

At operation 310, one or more inference models are obtained. The inference models may be implemented with, for example, neural network inference models. The inference models may generate inferences that may be usable to downstream consumers.

In an embodiment, the inference models are obtained by inference model manager 102 using training data sets. The training data sets may be fed into the neural network inference models (and/or any other type of inference generation models) as part of a training process to obtain the inference models. The inference models may also be obtained from another entity through a communication system. For example, an inference model may be obtained by another entity through training a neural network inference model and providing the trained neural network inference model to inference model manager 102.

At operation 312, characteristics of the one or more inference models are identified. The characteristics of the inference models may include a computing resource requirement for each inference model, a priority ranking for each inference model, and/or other characteristics. The priority ranking may indicate a preference for future completion of inference generation by each inference model of the inference models. A higher priority ranking may indicate a higher degree of preference to a downstream consumer. For example, a first inference model may be assigned a higher priority ranking and a second inference model may be assigned a lower priority ranking. The inferences generated by the first inference model may be critical to an industrial process overseen by the downstream consumer. The inferences generated by the second inference model may include supplemental information related to the industrial process. The supplemental information may be of interest to the downstream consumer but may not be critical to the industrial process. The priority rankings may be used by the inference model when a probability of successful completion of execution of the inference models is below a probability threshold. Refer to FIG. 3H for additional details.

In an embodiment, characteristics of the one or more inference models are identified by obtaining the characteristics of the one or more inference models from a downstream consumer. For example, the downstream consumer may transmit at least a portion of the characteristics of the one or more inference models (e.g., the priority rankings) to inference model manager 102 via one or more messages. The priority rankings (and/or other characteristics of the one or more inference models) may be obtained by another entity (e.g., a data aggregator) and provided to inference model manager 102. Inference model manager 102 may also be provided with instructions for retrieval of the characteristics of the one or more inference models from an inference model characteristic repository hosted by another entity throughout the distributed environment.

In an embodiment, inference model manager 102 identifies the characteristics of the one or more inference models by performing an analysis of the inference models trained by inference model manager 102. The characteristics of the one or more inference models may be identified from other sources and/or via other methods without departing from embodiments disclosed herein.

As previously mentioned, each inference model may have a corresponding computing resource requirement. The computing resource requirement may indicate the quantity of computing resources (e.g., storage, memory, processing resources, etc.) required to host and operate the inference model.

At operation 314, characteristics of data processing systems to which the one or more inference models may be deployed are identified. The characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems.

In an embodiment, the characteristics of the data processing systems are provided to inference model manager 102 by data processing systems 100, and/or by any other entity throughout the distributed environment. The characteristics of the data processing systems may be transmitted to inference model manager 102 as part of the operational capability data according to instructions specified by the execution plan. As an example, the execution plan may instruct the data processing systems to transmit operational capability data at regular intervals (e.g., once per hour, once per day, etc.).

The characteristics of the data processing systems may be transmitted by data processing systems 100 to inference model manager 102 upon request by inference model manager 102. Inference model manager 102 may request a transmission from data processing systems 100 and/or from another entity (e.g., a data aggregator) responsible for aggregating data related to the characteristics of the data processing systems. The characteristics of the data processing systems may be utilized by inference model manager 102 to obtain portions of inference models as described below.

At operation 316, portions of each inference model are obtained based on the characteristics of the data processing systems and the characteristics of the one or more inference models. To obtain the portions of the inference models, inference model manager 102 may, for example, represent a neural network inference model as a bipartite graph. The bipartite graph may indicate data dependencies between nodes in the neural network inference model. Refer to FIG. 2A for additional details regarding obtaining portions of an inference model.

In an embodiment, portions of each inference model are obtained by another entity in the distributed environment and via any method. The other entity may transmit the portions of the inference models (and/or instructions for obtaining the portions of the inference models) to inference model manager 102.

The method may end following operation 316.

Turning to FIG. 3C, a method of obtaining an execution plan in accordance with an embodiment is shown. The operations shown in FIG. 3C may be an expansion of operation 302 in FIG. 3A.

At operation 320, requirements of the downstream consumer are obtained. The requirements of the downstream consumer may include assurance levels for each portion of each inference model, execution locations for each portion of each inference model, an operational capability data transmission schedule for the data processing systems, and/or other requirements.

In an embodiment, requirements of the downstream consumer are obtained by inference model manager 102 directly from the downstream consumer prior to initial deployment of the inference models, at regular intervals, and/or in response to an event instigating a change in the requirements of the downstream consumer.

In an embodiment, another entity (e.g., a downstream consumer data aggregator) aggregates data related to the needs of one or more downstream consumers throughout a distributed environment and transmits this information to inference model manager 102 as needed.

At operation 322, assurance levels are determined for the inference model portions based on the requirements of the downstream consumer. Assurance levels may indicate a quantity of instances of a corresponding inference model portion that are to be hosted by the data processing systems. For example, a first inference model may be partitioned into a first portion and a second portion. The assurance level for the first inference model may specify that two instances of the first portion and three instances of the second portion must be operational to comply with the needs of the downstream consumer.

In an embodiment, the assurance levels are based on inference model redundancy requirements indicated by the downstream consumer at any time and/or are included in the requirements of the downstream consumer obtained in operation 320. The assurance levels may be transmitted to inference model manager 102 directly from the downstream consumer, may be obtained from another entity responsible for determining assurance levels based on the needs of the downstream consumer, and/or from other sources. In an embodiment, inference model redundancy requirements of the downstream consumer are transmitted from the downstream consumer to inference model manager 102 and inference model manager 102 may determine the assurance levels based on the inference model redundancy requirements.

At operation 324, distribution locations are determined for the inference model portions based on the requirements of the downstream consumer. Distribution locations (e.g., execution locations) may be selected to reduce geographic clustering of redundant instances of the inference model portions. In an embodiment, the distribution locations are included in the needs of the downstream consumer obtained in operation 320. In an embodiment, inference model manager 102 (and/or another entity) obtains the needs of the downstream consumer and may determine the distribution locations based on the needs of the downstream consumer.

At operation 326, an operational capability data transmission schedule is determined for the data processing systems based on the requirements of the downstream consumer. The operational capability data transmission schedule may instruct data processing systems to transmit operational capability data to inference model manager 102 at various time intervals. For example, the operation of a downstream consumer may be highly sensitive to variations in transmissions of the inferences generated by the inference model (e.g., latencies in receiving inferences due to communication pathway bottlenecks). Therefore, the downstream consumer may require frequent updates to the execution plan. To do so, inference model manager 102 may determine an operational capability data transmission schedule of five transmissions per hour. In another example, the operation of a second downstream consumer may not be highly sensitive to variations in transmissions of the inferences generated by the inference model (e.g., latencies in receiving inferences due to communication pathway bottlenecks). Therefore, the downstream consumer may not require frequent updates to the execution plan and inference model manager may determine an operational capability data transmission schedule of one transmission per day.

In an embodiment, the operational capability data transmission schedule is determined by inference model manager 102 based on the needs of the downstream consumer. To do so, the downstream consumer (and/or another entity throughout the distributed environment) may transmit operational capability data transmission frequency requirements to inference model manager 102. Inference model manager 102 may then determine the operational data transmission schedule based on the operational capability data transmission frequency requirements. In an embodiment, the operational capability data transmission schedule is determined by the downstream consumer (and/or other entity) and instructions to implement the operational capability data transmission schedule are transmitted to inference model manager 102.

The method may end following operation 326.

Turning to FIG. 3D, a method of managing the execution of the inference models in accordance with an embodiment is shown. The operations shown in FIG. 3D may be an expansion of operation 308 in FIG. 3A.

At operation 330, downstream consumer information and data processing system information are obtained. The downstream consumer information may indicate a series of preferences for execution of the inference models. For example, the downstream consumer information may indicate: (i) an inference model bias preference, (ii) sensitivity regions, (iii) an inference uncertainty goal, and/or (iv) a likelihood of completion of execution of the inference models. The inference model bias preference may indicate that a first type of inference model is biased towards generating a first type of inference (refer to FIG. 3E for more information). The sensitivity regions may define ranges of values of inferences generated by the inference models that, when met, initiate a change in operation of the inference models (refer to FIG. 3F for more information). The inference uncertainty goal may indicate an uncertainty threshold for acceptable uncertainty in inferences generated by the inference models (refer to FIG. 3G for more information). The likelihood of completion of execution of the inference models may include a preference for continued operation of a first type of inference model when a probability of successful completion of execution of the inference models is below a probability threshold (refer to FIG. 3H for more information).

In an embodiment, inference model manager 102 obtains the downstream consumer information from any number of downstream consumers. The downstream consumer information may be obtained at regular intervals (e.g., once per day) and/or as needed to respond to changes in the needs of the downstream consumer. In an embodiment, another entity (e.g., a downstream consumer manager) aggregates downstream consumer information from one or more downstream consumers and transmit the data to inference model manager 102.

The data processing system information may indicate quantities of types of the inference models that are hosted by the data processing systems. For example, the data processing system information may include a listing of each data processing system and the inference model (or the portion of an inference model) currently hosted by each data processing system. In addition, the data processing system information may include a current computing resource capacity of each of the data processing systems and/or other information.

In an embodiment, inference model manager 102 obtains the data processing system information from each data processing system of data processing systems 100. In an embodiment, another entity (e.g., a data processing system manager) collects data processing system information from data processing systems 100 and provides the data processing system information to inference model manager 102. The data processing system information may be obtained at regular intervals (e.g., once per hour) and/or as needed by inference model manager 102. The schedule for transmission of data processing system information may be dictated by the execution plan.

At operation 332, an analysis is performed of the downstream consumer information and the data processing system information to identify a set of potential changes to the execution plan. The analysis may include a set of analyses including: (i) a bias analysis (refer to FIG. 3E for more information), (ii) a process sensitivity analysis (refer to FIG. 3F for more information), (iii) an uncertainty analysis (refer to FIG. 3G for more information), and/or (iv) a completion success analysis (refer to FIG. 3H for more information). The analysis may be performed by inference model manager 102 and/or by another entity (e.g., a data manager) throughout the distributed system. The set of potential changes to the execution plan may include any number of potential changes and may include deploying new instances of inference models and/or new sets of instructions for executing the inference models by the data processing systems. Refer to FIGS. 3E-3H for additional information regarding the analysis.

At operation 334, at least one potential change of the set of potential changes to the execution plan is implemented to obtain an updated execution plan for the inference models. The at least one potential change may be implemented by inference model manager 102. In an embodiment, the at least one potential change is implemented by any other entity throughout the distributed system to obtain the updated execution plan. The updated execution plan may be transmitted from any other entity to inference model manager 102 for implementation.

At operation 336, a distribution of the inference models is updated based on the updated execution plan. In an embodiment, inference model manager 102 updates the distribution of the inference models by: (i) deploying new instances of the inference models to the data processing systems, (ii) transmitting new instructions to the data processing systems for execution of the inference models. In an embodiment, the updated execution plan is transmitted to another entity (e.g., an inference model deployment manager) and the inference model deployment manager updates the distribution of the inference models based on the updated execution plan.

The method may end following operation 336.

Figure 3E:
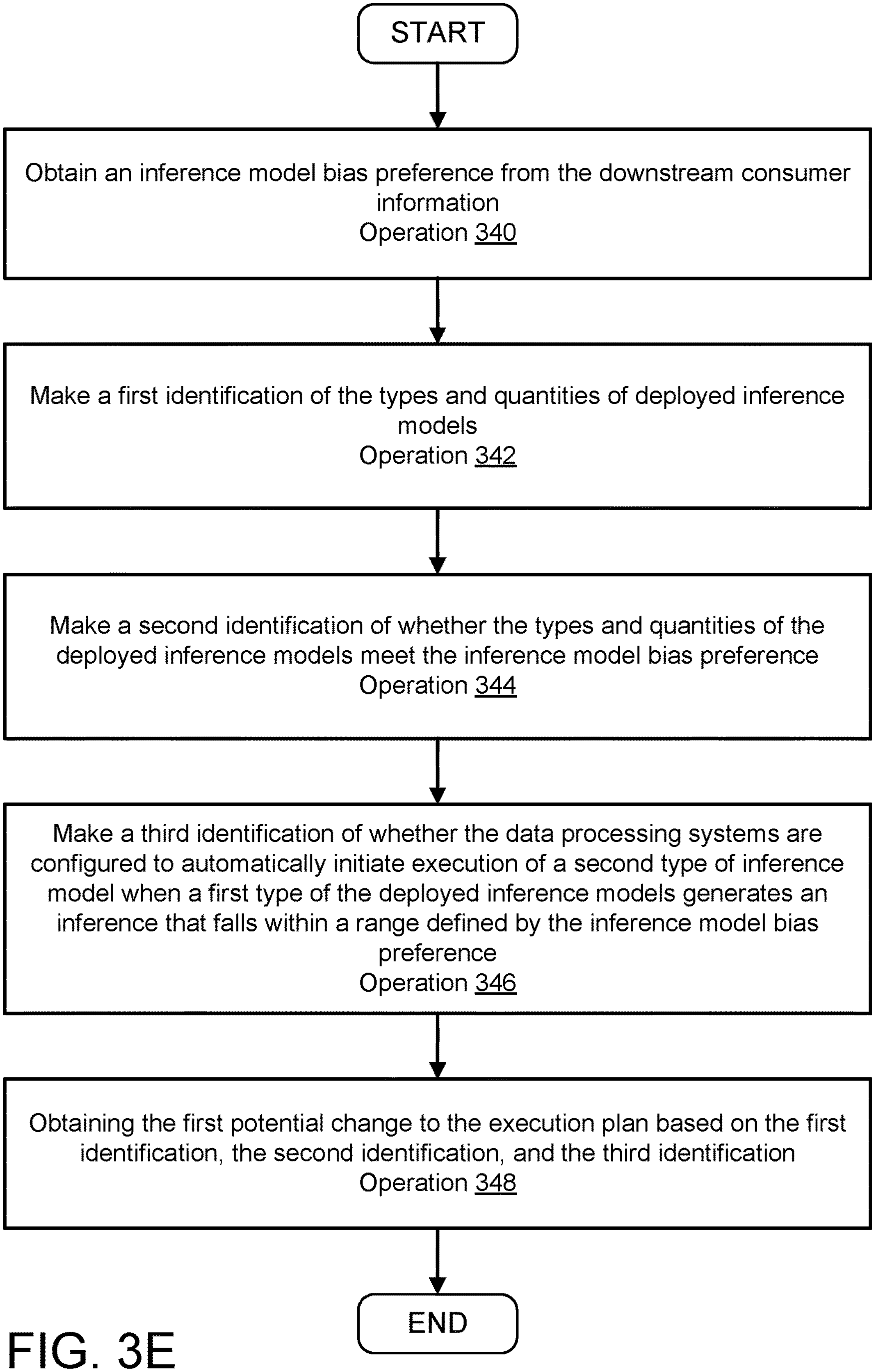
FIG. 3E shows a flow diagram illustrating a method of performing a bias analysis of the inference models in accordance with an embodiment.

Turning to FIG. 3E, a method of performing a bias analysis of the inference models in accordance with an embodiment is shown. The operations in FIG. 3E may be, at least in part, an expansion of operation 332 in FIG. 3D.

At operation 340, an inference model bias preference is obtained from the downstream consumer information. The inference model bias preference may indicate that a first type of inference model of the inference models may be biased towards generating a first type of inference. The first type of inference model may consume a first quantity of computing resources and a second type of inference model of the inference models may consume a second quantity of computing resources. In addition, the first type of inference model may be of a lower complexity topology than the second type of inference model and, therefore, may generate less accurate inferences than the second type of inference model. Inference model manager 102 may extract the inference model bias preference from the downstream consumer information, may obtain the inference model bias preference in a separate transmission from the downstream consumer, and/or may obtain the inference model bias preference from another entity throughout the distributed environment.

For example, consider a scenario in which the first type of inference model may be trained to identify inclement weather patterns, the identified inclement weather patterns being keyed to an action set intended to protect the data processing systems from the inclement weather. As previously mentioned, the first type of inference model may generate inferences with lower accuracy and, therefore, may not reliably identify inclement weather patterns. To bolster the first inference model's ability to reliably detect inclement weather patterns, inference model manager 102 may bias the inference model to preferentially generate inferences identifying weather patterns as inclement weather patterns.

The first type of inference model may be, for example, a neural network inference model (or any other type of predictive model). The inference model bias preference may be implemented by, for example, modifying a loss function of the neural network to bias the output towards a desired inference model result. The loss function of the neural network may be modified by inference model manager 102 and/or any other entity responsible for training and/or updating inference models.

At operation 342, a first identification of the types and quantities of deployed inference models is made. The first identification may be based, at least in part, on the data processing system information obtained in operation 330 of FIG. 3D. The first identification may be based on other data obtained from the data processing systems at other times without departing from embodiments disclosed herein.

In an embodiment, the first identification is made by inference model manager 102, by data processing systems 100, and/or by any other entity throughout the distributed system. For example, inference model manager 102 may make the first identification by obtaining a listing of the number of data processing systems and the type of inference model deployed to each data processing system of the data processing systems.

At operation 344, a second identification is made of whether the types and quantities of the deployed inference models meet the inference model bias preference. The second identification may be made, at least in part, by comparing the results of the first identification to the inference model bias preference obtained in operation 340. If the first identification meets the inference model bias preference, no additional action may be needed. If the first identification does not meet the inference model bias preference, a potential change to the execution plan may be identified (refer to operation 348).

In an embodiment, the second identification is made by inference model manager 102. In an embodiment, the inference model bias preference and the results of the first identification are obtained by another entity (e.g., data processing systems 100). The other entity may perform the second identification and transmit the results of the second identification to inference model manager 102 (and/or any entity performing the third identification as described below).

At operation 346, a third identification is made of whether the data processing systems are configured to automatically initiate execution of a second type of inference model when a first type of the deployed inference models generates an inference that falls within a range defined by the inference model bias preference. The third identification may be based, least in part, on instructions for execution of the inference models previously transmitted to the data processing systems.

In an embodiment, inference model manager 102 (and/or any other entity) identifies current instructions followed by each data processing system of data processing systems 100 (e.g., by requesting the instructions be transmitted to inference model manager 102, by transmitting a copy of the instructions to data processing systems 100 and asking for confirmation that the instructions match the copy of the instructions, and/or via other methods). Inference model manager 102 (and/or any other entity) may then determine whether the current instructions comply with the needs of the downstream consumer obtained as part of the downstream consumer information.

For example, the data processing systems may generate inferences to identify inclement weather patterns as previously described and a first type of the inference models may be biased to preferentially identify weather patterns as inclement weather patterns. Therefore, if the first type of the inference models generates an inference identifying a weather pattern as a non-inclement weather pattern (e.g., an inference other than the biased result), data processing systems 100 may be configured to automatically execute the second type of inference model (e.g., the more complex topology inference model) to lower the chances of misidentifying inclement weather patterns as non-inclement weather patterns.

At operation 348, the first potential change to the execution plan is obtained based on the first identification, the second identification, and the third identification. The first potential change to the execution plan may include instructions for: (i) deploying an updated inference model bias preference if the types and quantities of the inference models do not match the inference model bias preference obtained from the downstream consumer, and/or (ii) deploying new instructions for execution of the inference models to data processing systems 100 to comply with the needs of the downstream consumer.

In an embodiment, the first potential change is obtained by inference model manager 102 by obtaining the results of the first identification, the second identification, and the third identification. In an embodiment, inference model manager 102 transmits the results of the first identification, the second identification, and the third identification to another entity (e.g., an execution plan manager) and the execution plan manager obtains the first potential change to the execution plan. The first potential change to the execution plan may be obtained via other methods without departing from embodiments disclosed herein.

The method may end following operation 348.

Figure 3F:
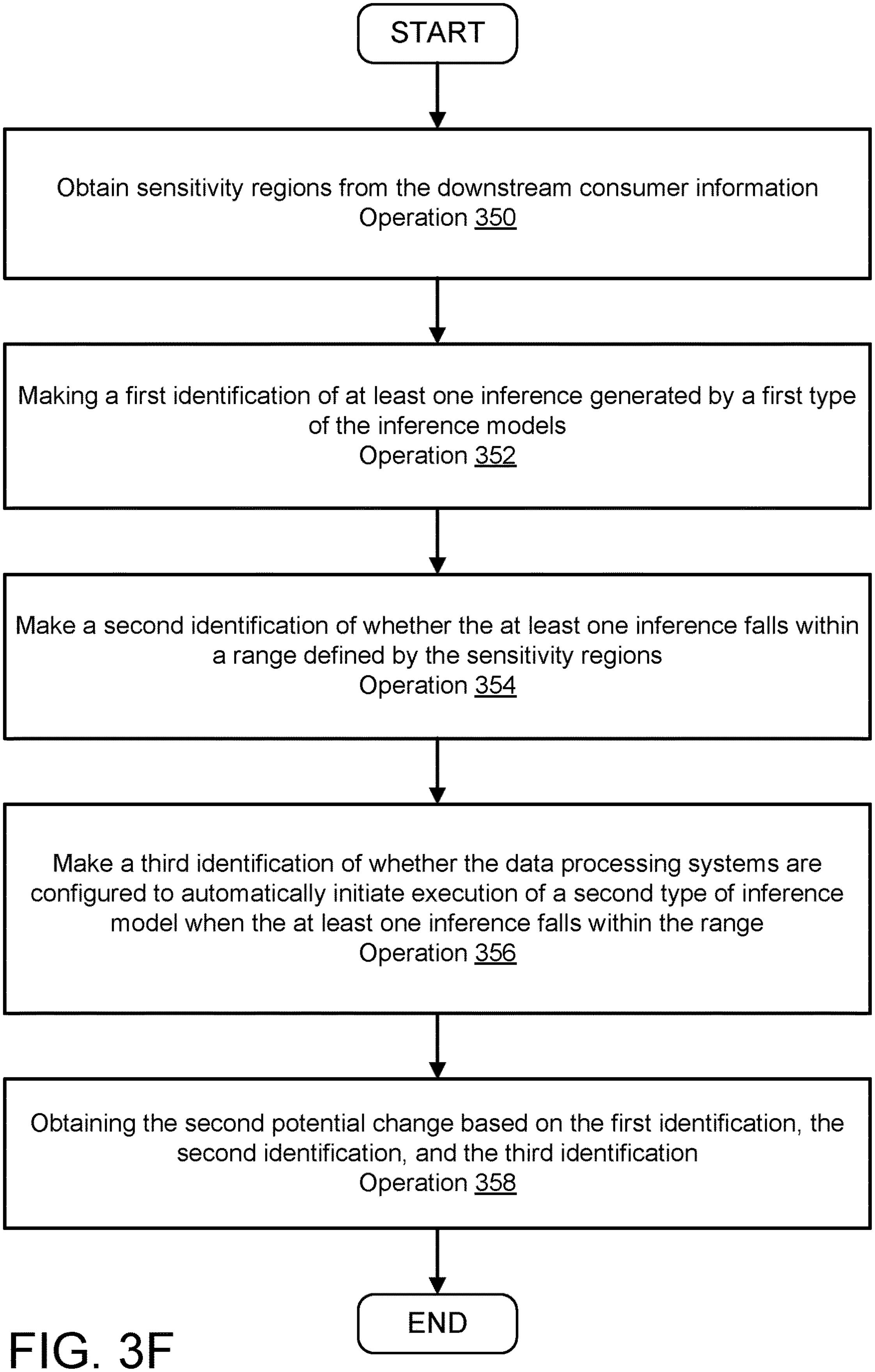
FIG. 3F shows a flow diagram illustrating a method of performing a process sensitivity analysis of the inference models in accordance with an embodiment.

Turning to FIG. 3F, a method of performing a process sensitivity analysis of the inference models is shown. The operations shown in FIG. 3F may be, at least in part, an expansion of operation 332 in FIG. 3D.

At operation 350, sensitivity regions are obtained from the downstream consumer information. The sensitivity regions may define ranges of values of inferences generated by the inference models that, when met, initiate a change in operation of the inference models. Inference model manager 102 may extract the sensitivity regions from the downstream consumer information, may obtain the sensitivity regions in a separate transmission from the downstream consumer, and/or may obtain the sensitivity regions from another entity throughout the distributed environment. In an embodiment, sensitivity regions define ranges of inferences indicating, for example, geographical locations of the data processing systems. Therefore, the operation of the inference models may change when the data processing systems enter a new geographical region.

For example, consider a scenario in which a first inference model may be trained to generate inferences predicting the temperature of a reagent involved in an industrial chemical synthesis. The downstream consumer may indicate a safe temperature range for the reagent of 10° C.-25° C. and the first inference model may generate inferences to predict the temperature of the reagent over time. The sensitivity region may include a range of temperature inferences close to the unsafe temperature range (e.g., 20° C.-25° C.). If the temperature of the reagent reaches the sensitivity region, the downstream consumer may wish to monitor the temperature of the reagent more closely. To do so, data processing systems 100 may automatically operate a second inference model (e.g., a higher complexity topology and, therefore, more accurate inference model than the first inference model) until the temperature inferences return to a range outside the sensitivity region. The downstream consumer may change the sensitivity regions over time depending on the desired level of monitoring of inferences generated by the inference models.

At operation 352, a first identification is made of at least one inference generated by a first type of the inference models. The at least one inference may include any inference generated by any instance of the first type of the inference models deployed to data processing systems 100. The first type of the inference models may be a lower complexity topology inference model than a second type of the inference models deployed to data processing systems 100.

In an embodiment, the at least one inference is obtained by data processing systems 100 by feeding input data as an ingest into the first type of the inference model and obtaining the at least one inference as the output of the first type of the inference model. Data processing systems 100 may then transmit the at least one inference to inference model manager 102 and/or to another entity throughout the distributed environment responsible for performing the first identification.

For example, the at least one inference may include an average temperature inference for the previously described reagent over the course of one hour of $T_1$=22° C. The first identification may be made by inference model manager 102, any of data processing systems 100, and/or any other entity throughout the distributed environment.

At operation 354, a second identification is made of whether the at least one inference falls within a range defined by the sensitivity regions. In an embodiment, inference model manager 102 performs the second identification. In an embodiment, another entity throughout the distributed environment (e.g., data processing systems 100) obtains the at least one inference and the sensitivity regions (from inference model manager 102 and/or other sources) and performs the second identification.

Continuing with the above example, the sensitivity region may include a temperature range of 20° C.-25° C. Therefore, the average temperature inference of $T_1$=22° C. may fall within the sensitivity region and the second identification may include instructions to transmit a notification of this occurrence to the downstream consumer.

At operation 356, a third identification is made of whether the data processing systems are configured to automatically initiate execution of a second type of inference model when the at least one inference falls within the range. The third identification may be based, least in part, on instructions for execution of the inference models previously transmitted to data processing systems 100. For example, data processing systems 100 may be configured to execute the second type of inference model (e.g., a higher complexity topology inference model than the first type of inference model) when the first type of inference model generates an inference within the sensitivity regions.

In an embodiment, inference model manager 102 (and/or any other entity) identifies the current instructions followed by each data processing system of data processing systems 100 (e.g., by requesting the instructions be transmitted to inference model manager 102, by transmitting a copy of the instructions to data processing systems 100 and asking for confirmation that the instructions match the copy of the instructions, and/or via other methods). Inference model manager 102 (and/or any other entity) may then determine whether the current instructions comply with the needs of the downstream consumer obtained as part of the downstream consumer information.

At operation 358, the second potential change to the execution plan is obtained based on the first identification, the second identification, and the third identification. The first potential change to the execution plan may include instructions for: (i) deploying updated sensitivity regions if the downstream consumer has indicated a change to the sensitivity regions, and/or (ii) deploying new instructions for execution of the inference models to data processing systems 100 to comply with the needs of the downstream consumer.

In an embodiment, the second potential change is obtained by inference model manager 102 by obtaining the results of the first identification, the second identification, and the third identification. In an embodiment, inference model manager 102 transmits the results of the first identification, the second identification, and the third identification to another entity (e.g., an execution plan manager) and the execution plan manager obtains the second potential change to the execution plan. The second potential change to the execution plan may be obtained via other methods without departing from embodiments disclosed herein.

The method may end following operation 358.

Figure 3G:
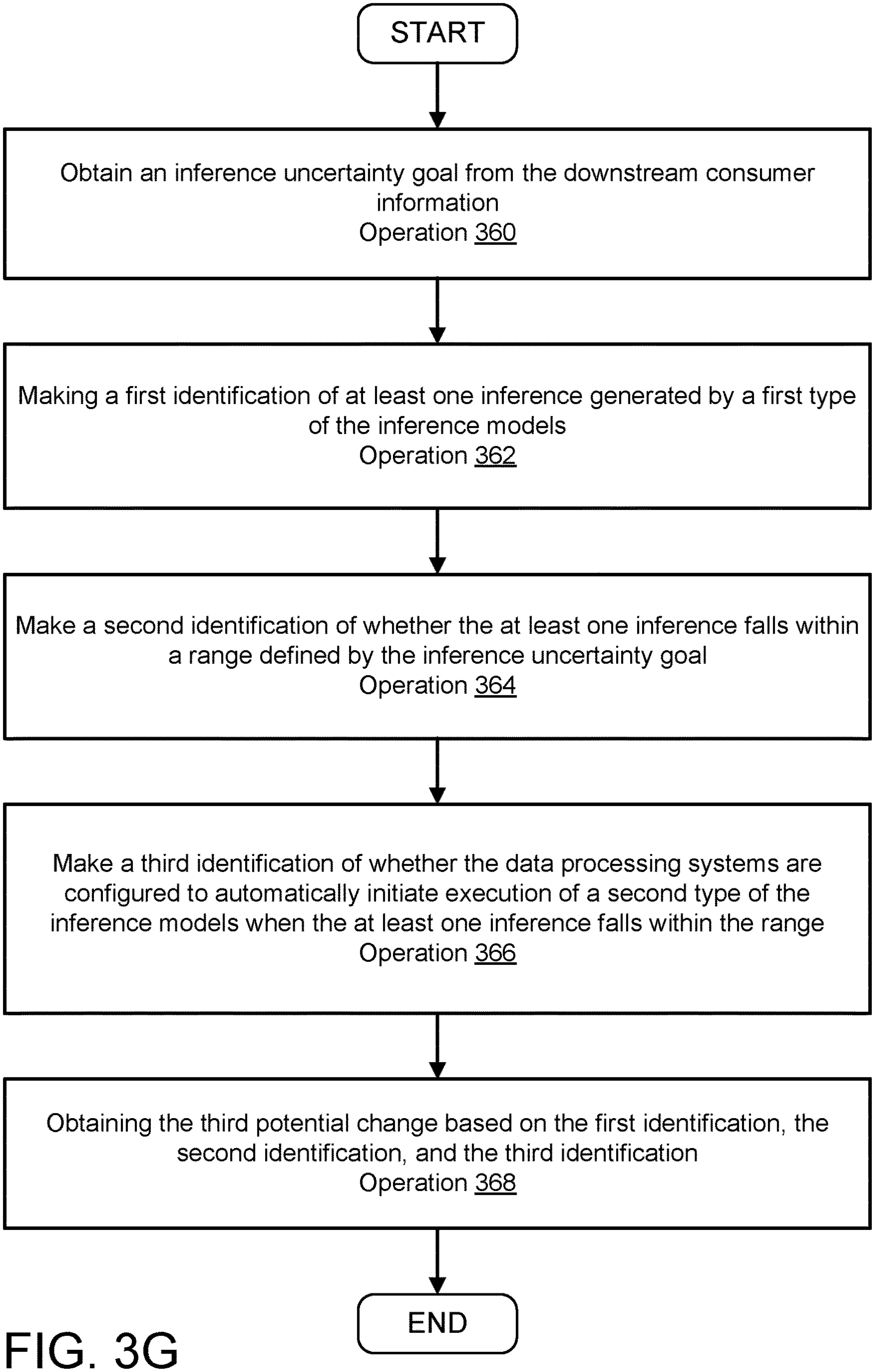
FIG. 3G shows a flow diagram illustrating a method of performing an uncertainty analysis of the inference models in accordance with an embodiment.
Figure 3H:
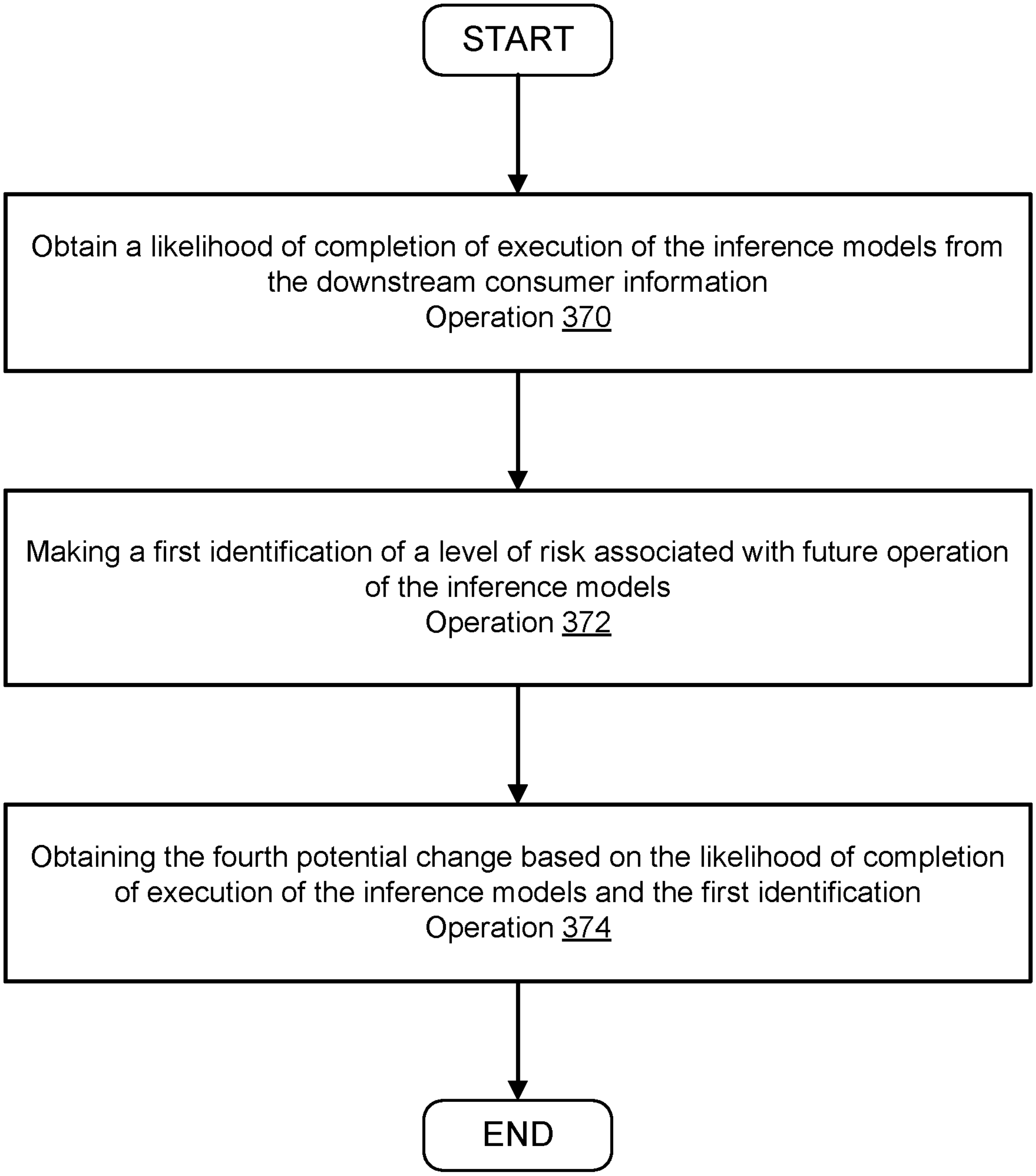
FIG. 3H shows a flow diagram illustrating a method of performing a completion success analysis of the inference models in accordance with an embodiment.

Turning to FIG. 3G, a method of performing an uncertainty analysis of the inference models is shown. The operations shown in FIG. 3G may be, at least in part, an expansion of operation 332 in FIG. 3D.

At operation 360, an inference uncertainty goal is obtained from the downstream consumer information. The inference uncertainty goal may indicate an uncertainty threshold for acceptable uncertainty in inferences generated by a first type of the inference models. The first type of the inference models may be a lower complexity topology inference model than a second type of inference model deployed to data processing systems 100. The first type of the inference models may generate an inference uncertainty quantification along with each inference. The uncertainty threshold may indicate a value (or a range of values) of the inference uncertainty quantification. Any value within the threshold may be considered an acceptable amount of uncertainty in the inference and any value outside the threshold may be considered an unacceptable amount of uncertainty in the inference.

In an embodiment, inference model manager 102 extracts the inference uncertainty goal from the downstream consumer information, may obtain the inference uncertainty goal in a separate transmission from the downstream consumer, and/or may obtain the inference uncertainty goal from another entity throughout the distributed environment.

For example, the uncertainty threshold may indicate an inference uncertainty quantification of 0.50 or below as acceptable and any inference uncertainty quantification above 0.50 as unacceptable to the needs of the downstream consumer.

At operation 362, a first identification is made of at least one inference generated by a first type of the inference models. The first type of the inference models may be a lower complexity topology inference model than a second type of the inference models deployed to data processing systems 100. The at least one inference may include any inference generated by any instance of the first type of the inference models deployed to the data processing systems.

In an embodiment, the at least one inference is obtained by data processing systems 100 by feeding input data as an ingest into the first type of the inference model and obtaining the at least one inference as the output of the first type of the inference model. Data processing systems 100 may then transmit the at least one inference to inference model manager 102 and/or to another entity throughout the distributed environment responsible for performing the first identification. The first identification may be made by inference model manager 102, any of data processing systems 100, and/or any other entity throughout the distributed environment.

For example, a first inference may include an average temperature inference of a reagent in an industrial chemical synthesis. The first inference may include an average temperature of $T_1$=35° C. The first type of inference model may also generate an uncertainty quantification for each inference. The uncertainty quantification for the first inference may be 0.65.

At operation 364, a second identification is made of whether the at least one inference falls within a range defined by the inference uncertainty goal. In an embodiment, inference model manager 102 performs the second identification. In an embodiment, another entity throughout the distributed environment (e.g., data processing systems 100) obtains the at least one inference and the inference uncertainty goal (from inference model manager 102 and/or other sources) and performs the second identification.

Continuing with the above example, the inference uncertainty goal may include an uncertainty threshold of 0.50 for inference uncertainty quantifications associated with inferences generated by the inference models. The first inference may have an inference uncertainty quantification of 0.65. Therefore, the second identification may determine that the inference falls within the range considered unacceptable according to the inference uncertainty goal.

At operation 366, a third identification is made of whether the data processing systems are configured to automatically initiate execution of a second type of the inference models when the at least one inference falls within the range. The second type of the inference models may be a higher complexity topology inference model than the first type of the inference models. The third identification may be based, least in part, on instructions for execution of the inference models previously transmitted to data processing systems 100. For example, data processing systems 100 may be configured to operate the second type of the inference models (e.g., the higher complexity topology inference model) in the event of generation of an inference with an inference uncertainty quantification outside of the inference uncertainty threshold.

In an embodiment, inference model manager 102 (and/or any other entity) identifies the current instructions followed by each data processing system of data processing systems 100 (e.g., by requesting the instructions be transmitted to inference model manager 102, by transmitting a copy of the instructions to data processing systems 100 and asking for confirmation that the instructions match the copy of the instructions, and/or via other methods). Inference model manager 102 (and/or any other entity) may then determine whether the current instructions comply with the needs of the downstream consumer obtained as part of the downstream consumer information.

At operation 368, the third potential change is obtained based on the first identification, the second identification, and the third identification. The third potential change to the execution plan may include instructions for: (i) deploying an updated uncertainty threshold if the types and quantities of the inference models do not match the inference uncertainty goal obtained from the downstream consumer, and/or (ii) deploying new instructions for execution of the inference models to data processing systems 100 to comply with the needs of the downstream consumer.

In an embodiment, the third potential change is obtained by inference model manager 102 by obtaining the results of the first identification, the second identification, and the third identification. In an embodiment, inference model manager 102 transmits the results of the first identification, the second identification, and the third identification to another entity (e.g., an execution plan manager) and the execution plan manager obtains the third potential change to the execution plan. The third potential change to the execution plan may be obtained via other methods without departing from embodiments disclosed herein.

The method may end following operation 368.

Turning to FIG. 3H, a method of performing a completion success analysis of the inference models is shown. The operations shown in FIG. 3H may be, at least in part, an expansion of operation 332 in FIG. 3D.

At operation 370, a likelihood of completion of execution of the inference models is obtained from the downstream consumer information. The likelihood of completion of execution of the inference models may include a preference for continued operation of a first type of inference model when a probability of successful completion of execution of the inference models is below a probability threshold. The first type of inference model and second type of inference model may be any type of inference model (e.g., higher or lower complexity topology inference models). Inference model manager 102 may extract the likelihood of completion of execution of the inference models from the downstream consumer information, may obtain the likelihood of completion of execution of the inference models in a separate transmission from the downstream consumer, and/or may obtain the likelihood of completion of execution of the inference models from another entity throughout the distributed environment. The preference for continued operation of the first type of inference model may be based, at least in part, on the priority ranking of the first type of inference model as described with respect to FIG. 3B In an embodiment, each data processing system of data processing systems 100 (and/or another entity) generates a probability value for the probability of future successful completion of execution of the inference model hosted by data processing systems 100. The probability threshold may indicate a probability value for acceptable probability of successful completion of execution of the inference models. Any probability value below the probability threshold may be considered unacceptable for the needs of the downstream consumer and any probability value above the probability threshold may be considered acceptable for the needs of the downstream consumer.

For example, the downstream consumer may determine any probability value below 0.6 to be unacceptable. Therefore, the probability threshold may be 0.6. In addition, the downstream consumer may prefer continued operation of the first type of inference model over the second type of inference model (due to inferences generated by the first inference model being of a higher degree of preference to the downstream consumer). Therefore, if inference model manager 102 (and/or data processing systems 100) identifies a probability value of 0.5, a change in the execution of the inference models may be required to support continued operation of the first type of inference model. The change in the execution of the inference models may include, for example, deploying redundant copies of the first type of inference model to data processing systems previously operating the second type of inference model.

At operation 372, a first identification is made of a level of risk associated with future operation of the inference models. The first identification may be based, at least in part, on the probability value associated with inferences generated by the inference models. The probability value may be generated by each data processing system, may be generated as an aggregate value from data collected from each data processing system, and/or may be generated by another entity to determine the level of risk associated with future operation of the inference models.

In an embodiment, the level of risk includes any number of levels of risk. For example, any probability value above the probability threshold may be assigned a level of risk of low risk. Similarly, any probability value below the probability threshold may be assigned a level of risk of high risk.

In an embodiment, the level of risk may include more than one threshold to identify more than two levels of risk. Any number of thresholds and any number of levels of risk may be identified without departing from embodiments disclosed herein.

At operation 374, the fourth potential change is obtained based on the likelihood of completion of execution of the inference models and the first identification. The fourth potential change may include (in the event of a probability value below the probability threshold) instructions for deploying redundant copies of the first type of inference model to data processing systems previously operating the second type of inference model. By doing so, the data processing systems may have a higher likelihood of successfully generating inferences using the first type of inference model.

In an embodiment, the fourth potential change is obtained by inference model manager 102 by obtaining the results of the first identification and the likelihood of completion of execution of the inference models. In an embodiment, inference model manager 102 may transmit the results of the first identification and the likelihood of completion of execution of the inference models to another entity (e.g., an execution plan manager) and the execution plan manager may obtain the fourth potential change to the execution plan. The fourth potential change to the execution plan may be obtained via other methods without departing from embodiments disclosed herein.

The method may end following operation 374.

Figure 4:
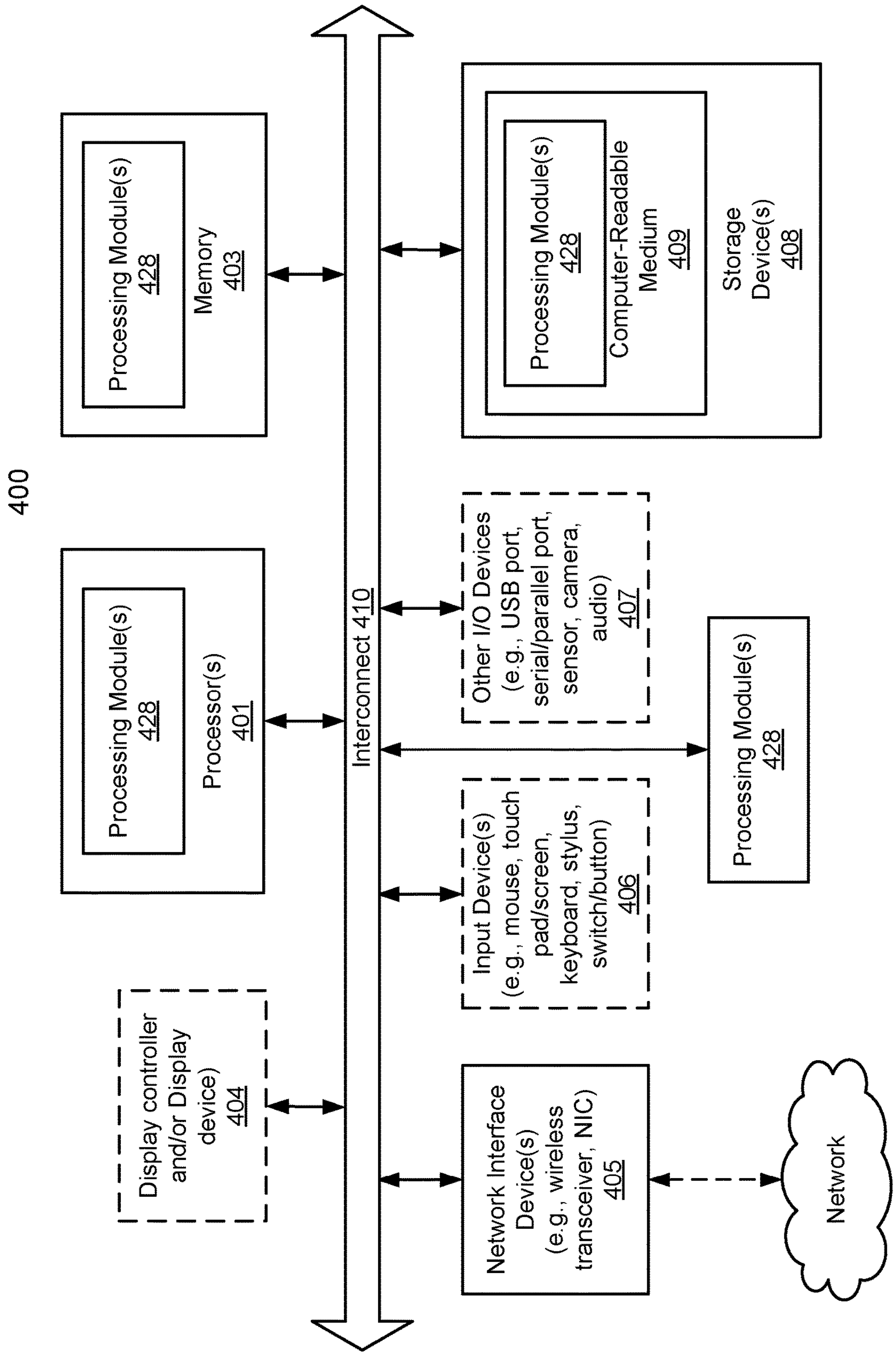
FIG. 4 shows a block diagram illustrating a data processing system in accordance with an embodiment.

Any of the components illustrated in FIGS. 1-3H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows© operating system from Microsoft©, Mac OS©/iOS© from Apple, Android© from Google©, Linux©, Unix©, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for dynamically managing inference models hosted by data processing systems to complete timely execution of the inference models, the method comprising:

obtaining downstream consumer information of a downstream consumer associated with the inference models, the downstream consumer information indicating:

an inference model bias preference; and an inference accuracy need of the downstream consumer;

obtaining data processing system information for the data processing systems, the data processing system information indicating quantities of types of the inference models that are hosted by the data processing systems;

performing, using the inference model bias preference and the data processing system information, a bias analysis for the inference models to identify a first potential change to an execution plan, the first potential change being a member of a set of potential changes, and the execution plan being determined during the bias analysis as being unable to meet the inference accuracy need of the downstream consumer;

implementing at least one potential change of the set of potential changes to the execution plan to obtain an updated execution plan for the inference models; and updating a distribution of the inference models based on the updated execution plan by at least:

retraining at least one inference model among the inference models to obtain an updated and retrained one of the at least one inference model that is biased based on the inference model bias preference of the downstream consumer to generate first inferences that meet the inference accuracy need of the downstream consumer, wherein the at least one inference model being a trained machine learning model that, prior to the retraining, generates second inferences that are determined when the bias analysis is performed as being unable to meet the inference accuracy need of the downstream consumer; and providing the updated and retrained one of the at least one inference model to a data processing system among the data processing systems that hosted the at least one inference model to replace the at least one inference model with the updated and retrained one of the at least one inference model.

2. The method of claim 1, wherein the downstream consumer information further indicates sensitivity regions, and the method further comprises:

performing, using the sensitivity regions, a process sensitivity analysis for an inference model of the inference models to identify a second potential change to the execution plan, wherein the set of potential changes further comprises the second potential change to the execution plan.

3. The method of claim 2, wherein the downstream consumer information further indicates an inference uncertainty goal, and the method further comprises:

performing, using the inference uncertainty goal, an uncertainty analysis for the inference model to identify a third potential change to the execution plan, wherein the set of potential changes further comprises the third potential change to the execution plan.

4. The method of claim 3, wherein the downstream consumer information further indicates a likelihood of completion of execution of the inference models, and the method further comprises:

performing, using the likelihood of completion of the execution of the inference models, a completion success analysis for the inference model to identify a fourth potential change to the execution plan; and wherein the set of potential changes further comprises the fourth potential change to the execution plan.

5. The method of claim 1, wherein the inference model bias preference indicates that a first type of inference model is biased towards generating a first type of inference, and the bias analysis comprises:

making a first identification of types and quantities of deployed inference models;

making a second identification of whether the types and the quantities of the deployed inference models meet the inference model bias preference;

making a third identification of whether the data processing systems are configured to automatically initiate execution of a second type of inference model when a first type of the deployed inference models generates an inference that falls within a range defined by the inference model bias preference; and obtaining the first potential change based on the first identification, the second identification, and the third identification.

6. The method of claim 5, wherein a first type of inference model of the inference models consumes a first quantity of computing resources, and a second type of inference model of the inference models consumes a second quantity of computing resources.

7. The method of claim 6, wherein the second type of inference model is of a higher complexity topology than the first type of inference model.

8. The method of claim 2, wherein the sensitivity regions define ranges of values of inferences generated by the inference models that, when met, initiate a change in operation of the inference models, and the process sensitivity analysis comprises:

making a first identification of at least one inference generated by a first type of the inference models;

making a second identification of whether the at least one inference falls within a range defined by the sensitivity regions;

making a third identification of whether the data processing systems are configured to automatically initiate execution of a second type of inference model when the at least one inference falls within the range; and obtaining the second potential change based on the first identification, the second identification, and the third identification.

9. The method of claim 3, wherein the inference uncertainty goal indicates an uncertainty threshold for acceptable uncertainty in inferences generated by the inference models, and the uncertainty analysis comprises:

making a first identification of at least one inference generated by a first type of the inference models;

making a second identification of whether the at least one inference falls within a range defined by the inference uncertainty goal;

making a third identification of whether the data processing systems are configured to automatically initiate execution of a second type of inference model when the at least one inference falls within the range; and obtaining the third potential change based on the first identification, the second identification, and the third identification.

10. The method of claim 4, wherein the likelihood of completion of execution of the inference models comprises:

a preference for continued operation of a first type of inference model when a probability of successful completion of execution of the inference models is below a probability threshold; and the completion success analysis comprises:

making a first identification of a level of risk associated with future operation of the inference models; and obtaining the fourth potential change based on the preference for the continued operation and the first identification.

11. A non-transitory machine-readable medium having instructions stored therein, which when executed by a processor, cause the processor to perform operations for dynamically managing inference models hosted by data processing systems to complete timely execution of the inference models, the operations comprising:

obtaining downstream consumer information of a downstream consumer associated with the inference models, the downstream consumer information indicating:

an inference model bias preference; and an inference accuracy need of the downstream consumer;

obtaining data processing system information for the data processing systems, the data processing system information indicating quantities of types of the inference models that are hosted by the data processing systems;

performing, using the inference model bias preference and the data processing system information, a bias analysis for the inference models to identify a first potential change to an execution plan, the first potential change being a member of a set of potential changes, and the execution plan being determined during the bias analysis as being unable to meet the inference accuracy need of the downstream consumer;

implementing at least one potential change of the set of potential changes to the execution plan to obtain an updated execution plan for the inference models; and updating a distribution of the inference models based on the updated execution plan by at least:

retraining at least one inference model among the inference models to obtain an updated and retrained one of the at least one inference model that is biased based on the inference model bias preference of the downstream consumer to generate first inferences that meet the inference accuracy need of the downstream consumer, wherein the at least one inference model being a trained machine learning model that, prior to the retraining, generates second inferences that are determined when the bias analysis is performed as being unable to meet the inference accuracy need of the downstream consumer; and providing the updated and retrained one of the at least one inference model to a data processing system among the data processing systems that hosted the at least one inference model to replace the at least one inference model with the updated and retrained one of the at least one inference model.

12. The non-transitory machine-readable medium of claim 11, wherein the downstream consumer information further indicates sensitivity regions, and the operations further comprise:

performing, using the sensitivity regions, a process sensitivity analysis for an inference model of the inference models to identify a second potential change to the execution plan, wherein the set of potential changes further comprises the second potential change to the execution plan.

13. The non-transitory machine-readable medium of claim 12, wherein the downstream consumer information further indicates an inference uncertainty goal, and the operations further comprise:

performing, using the inference uncertainty goal, an uncertainty analysis for the inference model to identify a third potential change to the execution plan, wherein the set of potential changes further comprises the third potential change to the execution plan.

14. The non-transitory machine-readable medium of claim 13, wherein the downstream consumer information further indicates a likelihood of completion of execution of the inference models, and the operations further comprise:

performing, using the likelihood of completion of the execution of the inference models, a completion success analysis for the inference model to identify a fourth potential change to the execution plan; and wherein the set of potential changes further comprises the fourth potential change to the execution plan.

15. The non-transitory machine-readable medium of claim 11, wherein the inference model bias preference indicates that a first type of inference model is biased towards generating a first type of inference, and the bias analysis comprises:

making a first identification of types and quantities of deployed inference models;

making a second identification of whether the types and the quantities of the deployed inference models meet the inference model bias preference;

making a third identification of whether the data processing systems are configured to automatically initiate execution of a second type of inference model when a first type of the deployed inference models generates an inference that falls within a range defined by the inference model bias preference; and obtaining the first potential change based on the first identification, the second identification, and the third identification.

16. A data processing system, comprising:

a processor; and a memory coupled to the processor to store instructions, which when executed by the processor, cause the processor to perform operations for dynamically managing inference models hosted by data processing systems to complete timely execution of the inference models, the operations comprising:

obtaining downstream consumer information of a downstream consumer associated with the inference models, the downstream consumer information indicating:

an inference model bias preference; and an inference accuracy need of the downstream consumer;

obtaining data processing system information for the data processing systems, the data processing system information indicating quantities of types of the inference models that are hosted by the data processing systems;

performing, using the inference model bias preference and the data processing system information, a bias analysis for the inference models to identify a first potential change to an execution plan, the first potential change being a member of a set of potential changes, and the execution plan being determined during the bias analysis as being unable to meet the inference accuracy need of the downstream consumer;

implementing at least one potential change of the set of potential changes to the execution plan to obtain an updated execution plan for the inference models; and updating a distribution of the inference models based on the updated execution plan by at least, by the processor:

retraining at least one inference model among the inference models to obtain an updated and retrained one of the at least one inference model that is biased based on the inference model bias preference of the downstream consumer to generate first inferences that meet the inference accuracy need of the downstream consumer, wherein the at least one inference model being a trained machine learning model that, prior to the retraining, generates second inferences that are determined when the bias analysis is performed as being unable to meet the inference accuracy need of the downstream consumer; and providing the updated and retrained one of the at least one inference model to a data processing system among the data processing systems that hosted the at least one inference model to replace the at least one inference model with the updated and retrained one of the at least one inference model.

17. The data processing system of claim 16, wherein the downstream consumer information further indicates sensitivity regions, and the operations further comprise:

performing, using the sensitivity regions, a process sensitivity analysis for an inference model of the inference models to identify a second potential change to the execution plan, wherein the set of potential changes further comprises the second potential change to the execution plan.

18. The data processing system of claim 17, wherein the downstream consumer information further indicates an inference uncertainty goal, and the operations further comprise:

performing, using the inference uncertainty goal, an uncertainty analysis for the inference model to identify a third potential change to the execution plan, wherein the set of potential changes further comprises the third potential change to the execution plan.

19. The data processing system of claim 18, wherein the downstream consumer information further indicates a likelihood of completion of execution of the inference models, and the operations further comprise:

performing, using the likelihood of completion of the execution of the inference models, a completion success analysis for the inference model to identify a fourth potential change to the execution plan; and wherein the set of potential changes further comprises the fourth potential change to the execution plan.

20. The data processing system of claim 16, wherein the inference model bias preference indicates that a first type of inference model is biased towards generating a first type of inference, and the bias analysis comprises:

making a first identification of types and quantities of deployed inference models;

making a second identification of whether the types and the quantities of the deployed inference models meet the inference model bias preference;

making a third identification of whether the data processing systems are configured to automatically initiate execution of a second type of inference model when a first type of the deployed inference models generates an inference that falls within a range defined by the inference model bias preference; and obtaining the first potential change based on the first identification, the second identification, and the third identification.

* * * * *